US011111148B2

(12) United States Patent
Ma et al.

(10) Patent No.: US 11,111,148 B2
(45) Date of Patent: Sep. 7, 2021

(54) GRAPHENE, PREPARATION METHOD THEREOF AND SUPERCAPACITOR ELECTRODE AND SUPERCAPACITOR CONTAINING THE GRAPHENE

(71) Applicant: INSTITUTE OF ELECTRICAL ENGINEERING, CHINESE ACADEMY OF SCIENCES, Beijing (CN)

(72) Inventors: Yanwei Ma, Beijing (CN); Chen Li, Beijing (CN); Xiong Zhang, Beijing (CN)

(73) Assignee: INSTITUTE OF ELECTRICAL ENGINEERING, CHINESE ACADEMY OF SCIENCES, Beijing (CN)

( * ) Notice: Subject to any disclaimer, the term of this patent is extended or adjusted under 35 U.S.C. 154(b) by 457 days.

(21) Appl. No.: 16/312,851

(22) PCT Filed: Mar. 10, 2017

(86) PCT No.: PCT/CN2017/076257
§ 371 (c)(1),
(2) Date: Dec. 21, 2018

(87) PCT Pub. No.: WO2017/219704
PCT Pub. Date: Dec. 28, 2017

(65) Prior Publication Data
US 2019/0210880 A1 Jul. 11, 2019

(30) Foreign Application Priority Data

Jun. 24, 2016 (CN) .......................... 201610476274.7

(51) Int. Cl.
*C01B 32/184* (2017.01)

(52) U.S. Cl.
CPC ........ *C01B 32/184* (2017.08); *C01B 2204/22* (2013.01); *C01P 2002/72* (2013.01); *C01P 2004/03* (2013.01)

(58) Field of Classification Search
CPC . C01B 32/184; C01B 2204/22; C01B 32/182; C01B 32/198; C01B 2204/00;
(Continued)

(56) References Cited

U.S. PATENT DOCUMENTS

2012/0068124 A1* 3/2012 Dickinson ................ C01G 9/02
252/509
2013/0295000 A1* 11/2013 Dickinson .............. B82Y 40/00
423/448

(Continued)

FOREIGN PATENT DOCUMENTS

CN 103112844 5/2013
CN 103221338 7/2013

(Continued)

OTHER PUBLICATIONS

Written Opinion of the International Searching Authority, PCT/CN2017/076257 dated Jun. 13, 2017 (Year: 2017).*

*Primary Examiner* — Daniel C. McCracken
(74) *Attorney, Agent, or Firm* — Robin L. Teskin; Baker, Donelson, Bearman, Caldwell & Berkowitz PC

(57) ABSTRACT

Provided are a graphene and a preparation method therefor. The method for preparing a graphene comprises following steps: i) placing a mixture of a magnesium powder and a solid oxide powder in a carbon dioxide-containing environment; and ii) heating the mixture to enable the magnesium powder to react with carbon dioxide, thereby obtaining a graphene. The specific surface area of the grapheme is 350-750 $m^2/g$, and the pore volume is 1-2 $cm^3/g$. The method for preparing a graphene in the present invention is simple and easy to carry out, and has a low cost and a high (Continued)

yield; and the graphene product has few impurities, a high carbon-oxygen ratio, and excellent capacitance performance and electrochemical stability.

20 Claims, 8 Drawing Sheets

(58) Field of Classification Search
CPC .......... C01B 2204/02; C01B 2204/04; C01B 2204/06; C01B 2204/065; C01B 2204/20; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01P 2002/72; C01P 2004/03; C01P 2004/04
See application file for complete search history.

(56) References Cited

U.S. PATENT DOCUMENTS

| | | | | |
|---|---|---|---|---|
| 2014/0193575 A1* | 7/2014 | Hosmane | ............. | C01B 32/184 |
| | | | | 427/122 |
| 2015/0210558 A1* | 7/2015 | Dickinson | ................ | C01F 5/04 |
| | | | | 423/600 |

FOREIGN PATENT DOCUMENTS

| | | | | |
|---|---|---|---|---|
| CN | 103332681 | | 10/2013 | |
| CN | 103482611 | * | 1/2014 | ............ C01B 31/04 |
| CN | 104876216 | | 9/2015 | |
| CN | 106115675 | | 11/2016 | |
| WO | 2012040303 | | 3/2012 | |
| WO | 2015119618 | | 8/2015 | |

* cited by examiner

GRAPHENE, PREPARATION METHOD THEREOF AND SUPERCAPACITOR ELECTRODE AND SUPERCAPACITOR CONTAINING THE GRAPHENE

RELATED APPLICATION INFORMATION

This application is a U.S. National Phase Application submitted under 35 U.S.C. 371 based on International Application No. PCT/CN2017/076257 filed Mar. 10, 2017 (published as WO2017/219704 on Dec. 28, 2017), which claims the benefit of Chinese Patent Application 201610476274.7 filed Jun. 24, 2016, each and all of which are hereby incorporated by reference in their entirety.

TECHNICAL FIELD

The present invention belongs to the field of carbon materials, particularly relates to a graphene and a preparation method therefor.

BACKGROUND ART

Graphene is a 2-dimensional material having a hexagonal honeycomb lattice structure in which carbon atoms are linked to each other in $sp^2$ hybrid orbitals. Due to its excellent mechanical, electrical, chemical and thermal properties, Graphene has drawn extensive attention from material researchers worldwide, and is considered to be one of the most promising, new next-generation materials. Graphene has been practically applied in the fields such as energy storage, photoelectric conversion and catalysis. Existing methods for preparing a graphene are mainly classified into two categories. One is a top-down method in which graphite is used as a source to prepare graphene by stripping graphite blocks, including liquid phase stripping, mechanical stripping, redox stripping, etc. The other is a bottom-up method in which a variety of carbon-containing small molecules are converted into graphene, including chemical vapor deposition, crystal epitaxial growth, etc.

It is a new method for preparing a graphene in recent years to use carbon dioxide as a raw material to prepare a graphene. The method has advantages such as a wide source of raw materials, a low price, and simple and convenient post-treatment of products, and therefore is considered to be one of the ways expected to solve the problem of large-scale preparation of a high-quality graphene. Chakrabarti et al burned metal Mg in dry ice to prepare a carbon nano-box (J. Mater. Chem. 2011, 21, 9491).

CONTENTS OF INVENTION

One object of the present invention is to provide a method for preparing a graphene, and a further object of the present invention is to provide a graphene.

The objects of the present invention are achieved by the following technical solutions:

A method for preparing a mesoporous graphene, comprising following steps:

Step 1, mixing a magnesium powder with a magnesium oxide powder homogeneously to obtain a mixed powder, placing the mixed powder in a sealed pressure-resistant container, and embedding a tungsten coil in the mixed powder;

Step 2, reducing the pressure of the sealed pressure-resistant container to $2 \times 10^{-4}$ Pa by using a molecular pump, and introducing carbon dioxide gas with a purity of 90-99.99% into the sealed pressure-resistant container until the pressure in the sealed pressure-resistant container is 0.125-10 MPa, wherein the carbon dioxide gas is introduced in a flow rate of 100-10000 sccm;

Step 3, applying a direct current of 0.5-30 A to the tungsten coil by using a direct current power supply, for a period of 5-30 s, and the reaction between the magnesium powder and the carbon dioxide is initiated by heat generated from the tungsten coil, thereby obtaining a black powder after reaction for 1-2 min;

Step 4, placing the black powder in a dilute acid solution, followed by standing for 6-48 h, then washing the black powder with deionized water by sucking filtration until neutral, to obtain a filter cake, and freeze-drying the filter cake to obtain a mesoporous graphene powder.

Further, in Step 1, the magnesium powder has a purity of 90-99.99%, and an average particle diameter of 1-1000 μm, and the magnesium oxide powder has a purity of 90-99.99%, and an average particle diameter of 0.1-1000 μm.

Further, in Step 1, the mixed powder has a mass ratio of the magnesium powder to the magnesium oxide powder of 1:0-1:10.

Further, the dilute acid solution is a dilute hydrochloric acid, a dilute sulfuric acid or a dilute nitric acid having a concentration of 0.2-2 M.

Further, the sealed pressure-resistant container is a sealed pressure-resistant steel container with a volume of 10-200 L.

Further, the freeze-drying in Step 4 comprises following steps:

Step 4.1, placing the filter cake into a plastic beaker, followed by adding deionized water to the plastic beaker, and then carrying out an ultrasonic treatment and a stirring step, thereby obtaining a paste;

Step 4.2, placing the paste in a cryogenic liquid for 2-30 min, thereby obtaining a black solid;

Step 4.3, drying the black solid in a freeze drier to obtain the mesoporous graphene powder.

Further, in Step 4.1, a mass ratio of the deionized water to the filter cake is 1:1-8:1.

Further, in Step 4.2, the cryogenic liquid is liquid nitrogen, liquid helium or liquid argon.

Further, the mesoporous graphene powder has a carbon-oxygen atomic ratio of above 80, and its pore size distribution is a uniform unimodal distribution.

Further, the mesoporous graphene powder has a pore size of 4 nm.

In one aspect, the present invention provides a method for preparing a graphene, comprising following steps:

i) placing a mixture comprising a magnesium powder and a solid oxide powder in a carbon dioxide-containing environment;

ii) heating the mixture to enable the magnesium powder to react with carbon dioxide, thereby obtaining a graphene.

In an embodiment, in a method for preparing a graphene, the chemical equation for the reaction of the magnesium powder with the carbon dioxide is: $2Mg + CO_2 \rightarrow 2MgO + C$.

In an embodiment, in a method for preparing a graphene, the reaction of the magnesium powder with the carbon dioxide is a self-propagating reaction.

In an embodiment, the method for preparing a graphene further comprises the following step:

iii) removing the magnesium oxide and/or the solid oxide from the product of Step ii).

In an embodiment, in a method for preparing a graphene, Step iii) comprises: washing the product of Step ii) with an acid.

In an embodiment, the method for preparing a graphene further comprises following steps:

iv) subjecting the product of Step iii) to one or more operations of washing, filtration or drying.

In an embodiment, in Step i) of the method for preparing a graphene, the mixture consists of a magnesium powder and a solid oxide powder.

In an embodiment, in a method for preparing a graphene, Step i) comprises mixing a magnesium powder with a solid oxide powder, and then placing the mixture in a sealed container filled with carbon dioxide.

In an embodiment, in Step i) of the method for preparing a graphene, a mass ratio of the magnesium powder to the solid oxide powder is 1:0.1~10.

In an embodiment, in Step i) of the method for preparing a graphene, a mass ratio of the solid oxide powder to the magnesium powder is 1~9:1.

In an embodiment, in Step i) of the method for preparing a graphene, a mass ratio of the solid oxide powder to the magnesium powder is 2~9:1.

In an embodiment, in Step i) of the method for preparing a graphene, a mass ratio of the solid oxide powder to the magnesium powder is 4~9:1.

In an embodiment, in Step i) of the method for preparing a graphene, a mass ratio of the solid oxide powder to the magnesium powder is 6~9:1.

In an embodiment, in Step i) of the method for preparing a graphene, a mass ratio of the solid oxide powder to the magnesium powder is 7~9:1.

In an embodiment, in Step i) of the method for preparing a graphene, a mass ratio of the solid oxide powder to the magnesium powder is 6~8:1.

In an embodiment, in Step i) of the method for preparing a graphene, the solid oxide powder has an average particle diameter of 0.1~1000 μm.

In an embodiment, in Step i) of the method for preparing a graphene, the solid oxide powder has an average particle diameter of 30~600 μm.

In an embodiment, in Step i) of the method for preparing a graphene, the solid oxide powder has an average particle diameter of 30~300 μm.

In an embodiment, in Step i) of the method for preparing a graphene, the solid oxide powder has an average particle diameter of 30~100 μm.

In an embodiment, in Step i) of the method for preparing a graphene, the solid oxide powder has an average particle diameter of 30~50 μm.

In an embodiment, in Step i) of the method for preparing a graphene, the magnesium powder has an average particle diameter of 9~9000 μm.

In an embodiment, in Step i) of the method for preparing a graphene, the magnesium powder has an average particle diameter of 30~600 μm.

In an embodiment, in Step i) of the method for preparing a graphene, the magnesium powder has an average particle diameter of 30~300 μm.

In an embodiment, in Step i) of the method for preparing a graphene, the magnesium powder has an average particle diameter of 30~900 μm.

In an embodiment, in Step i) of the method for preparing a graphene, the magnesium powder has an average particle diameter of 30~50 μm.

In an embodiment, in a method for preparing a graphene, the solid oxide is a metal oxide.

In an embodiment, in a method for preparing a graphene, the solid oxide is an alkaline earth metal oxide.

In an embodiment, in a method for preparing a graphene, the solid oxide is magnesium oxide.

In an embodiment, in a method for preparing a graphene, the environment of Step i) does not contain oxygen.

In an embodiment, in Step i) of the method for preparing a graphene, the carbon dioxide in the environment has a pressure of above 0.125 MPa.

In an embodiment, in Step i) of the method for preparing a graphene, the carbon dioxide in the environment has a pressure of above 0.5 MPa.

In an embodiment, in Step i) of the method for preparing a graphene, the carbon dioxide in the environment has a pressure of above 1 MPa.

In an embodiment, in Step i) of the method for preparing a graphene, the carbon dioxide in the environment has a pressure of above 5 MPa.

In an embodiment, in Step i) of the method for preparing a graphene, the carbon dioxide in the environment has a pressure of 0.125~10 MPa.

In an embodiment, in Step i) of the method for preparing a graphene, the carbon dioxide in the environment is above 90 volume %.

In an embodiment, in Step i) of the method for preparing a graphene, the carbon dioxide in the environment is 90-99.99 volume %.

In an embodiment, in Step ii) of the method for preparing a graphene, the mixture is heated by using an electrified metal conductor.

In an embodiment, in Step ii) of the method for preparing a graphene, the metal conductor is a tungsten coil.

In an embodiment, in Step ii) of the method for preparing a graphene, the electrified metal conductor is electrified with a direct current of 0.5-30 A (e.g. 1 A, 5 A, 10 A, 15 A, 20 A or 25 A).

In an embodiment, in Step i) of the method for preparing a graphene, the volume of the sealed container is 10-200 L (e.g. 15 L, 25 L, 50 L, 100 L, 150 L).

In an embodiment, in Step i) of the method for preparing a graphene, the content of the magnesium powder in the sealed container is 1~100 g/24 L, e.g. 8-40 g/24 L.

In an embodiment, in Step i) of the method for preparing a graphene, the content of the solid oxide powder in the sealed container is 1~500 g/24 L, e.g. 8-320 g/24 L.

In an embodiment, the method for preparing a graphene comprises one or more of the following steps:

a) mixing a magnesium powder with a magnesium oxide powder homogeneously to obtain a mixed powder, placing the mixed powder in a sealed pressure-resistant container, and embedding a tungsten coil in the mixed powder;

b) reducing gas pressure of the sealed pressure-resistant container to $2\times10^{-4}$ Pa, and introducing carbon dioxide gas into the sealed pressure-resistant container until the pressure in the sealed pressure-resistant container is 0.125~10 MPa;

c) applying a direct current of 0.5~30 A to the tungsten coil by using a direct current power supply, for a period of 5-30 s, and the reaction between the magnesium powder and carbon dioxide is initiated at the heat generated from the tungsten coil, thereby obtaining a powder after reaction;

d) placing the powder product of Step c) in a dilute acid solution, followed by standing for 6~8 h, washing the powder with deionized water by sucking filtration, collecting the filtrate, and freeze-drying the filtrate to obtain a graphene.

In another aspect, the present invention provides a graphene, which has a specific surface area of 350~750 $m^2g^{-1}$, and a pore volume of 1~2 $cm^3/g$.

In an embodiment, the graphene has a specific surface area of 400~750 m$^2$g$^{-1}$.

In an embodiment, the graphene has a specific surface area of 500~750 m$^2$g$^{-1}$.

In an embodiment, the graphene has a specific surface area of 600~750 m$^2$g$^{-1}$.

In an embodiment, the graphene has a specific surface area of 650~750 m$^2$g$^{-1}$.

In an embodiment, the graphene has a specific surface area of 680~710 m$^2$g$^{-1}$.

In an embodiment, the graphene has a pore volume of 0.8~1.8 cm$^3$g$^{-1}$.

In an embodiment, the graphene has a pore volume of 1~1.8 cm$^3$g$^{-1}$.

In an embodiment, the graphene has a pore volume of 1.2~1.8 cm$^3$g$^{-1}$.

In an embodiment, the graphene has a pore volume of 1.4~1.8 cm$^3$g$^{-1}$.

In an embodiment, the graphene has a pore volume of 1.5~1.6 cm$^3$g$^{-1}$.

In an embodiment, the there is a hysteresis loop in the nitrogen adsorption-desorption isothermal curve of the graphene.

In an embodiment, there is a peak in a range of 3~5 nm in the pore size distribution curve of the graphene.

In an embodiment, there is a peak in a range of 3.5~4.5 nm in a pore size distribution curve of the graphene of the graphene.

In an embodiment, there is only one peak in a pore size distribution curve of the graphene of the graphene.

In an embodiment, there is a peak with a peak width of 0.5~3 nm in a pore size distribution curve of the graphene of the graphene.

In an embodiment, there is a peak with a peak width of 0.5~2 nm in a pore size distribution curve of the graphene of the graphene.

In an embodiment, there is a peak with a peak width of 0.5~1 nm in a pore size distribution curve of the graphene of the graphene.

In an embodiment, there is a peak with a full width at half maxima (FWHM) of 0.5~3 nm in a pore size distribution curve of the graphene of the graphene.

In an embodiment, there is a peak with a FWHM of 0.5~2 nm in a pore size distribution curve of the graphene of the graphene.

In an embodiment, there is a peak with a FWHM of 0.5~1 nm in a pore size distribution curve of the graphene of the graphene.

In an embodiment, the graphene has less than 10 layers.

In an embodiment, the graphene has less than 5 layers.

In an embodiment, the graphene has 5~15 layers.

In an embodiment, the graphene has a carbon-oxygen atomic ratio of above 70.

In an embodiment, the graphene has a carbon-oxygen atomic ratio of above 80.

In an embodiment, the graphene has a carbon-oxygen atomic ratio of 80~90, e.g. 82.

In an embodiment, the graphene has a carbon content of above 90 at %.

In an embodiment, the graphene has a carbon content of above 92 at %.

In an embodiment, the graphene has a carbon content of above 94 at %.

In an embodiment, the graphene has a carbon content of above 96 at %.

In an embodiment, the graphene has a carbon content of above 97 at %.

In an embodiment, the graphene has a carbon content of 90~99 at %.

In an embodiment, the graphene has a weight loss of less than or equal to 5% when a temperature increases from 600 to 800° C., in a thermogravimetric curve of the graphene under an atmosphere of nitrogen.

In an embodiment, the graphene has a weight loss of less than or equal to 4% when a temperature increases from 600 to 800° C., in a thermogravimetric curve of the graphene under an atmosphere of nitrogen.

In an embodiment, the graphene has a weight loss of less than or equal to 3% when a temperature increases from 600 to 800° C., in a thermogravimetric curve of the graphene under an atmosphere of nitrogen.

In an embodiment, the graphene has a weight loss of above 98% when a temperature reaches 800° C., in a thermogravimetric curve of the graphene under an atmosphere of air.

In an embodiment, the graphene has a weight loss of above 99% when a temperature reaches 800° C., in a thermogravimetric curve of the graphene under an atmosphere of air.

In an embodiment, the graphene has a weight loss of 100% when a temperature reaches 800° C., in a thermogravimetric curve of the graphene under an atmosphere of air.

In an embodiment, the graphene has a relaxation time constant of less than or equal to 0.02 s.

In an embodiment, the graphene has a relaxation time constant of less than or equal to 0.015 s.

In an embodiment, the graphene has an electrical conductivity of above 8000 S m$^{-1}$.

In an embodiment, the graphene has an electrical conductivity of above 10000 S m$^{-1}$.

In an embodiment, the graphene has an electrical conductivity of above 12000 S m$^{-1}$.

In an embodiment, the graphene has an electrical conductivity of 8000~15000 S m$^{-1}$.

In an embodiment, the graphene has an electrical conductivity of 11000-13000 S m$^{-1}$.

In an embodiment, for the graphene, the intensity ratio of Peak D to Peak G ($I_D/I_G$) is above 0.3 in a Raman spectrum of the graphene.

In an embodiment, for the graphene, the intensity ratio of Peak D to Peak G ($I_D/I_G$) is above 0.5 in a Raman spectrum of the graphene.

In an embodiment, for the graphene, the intensity ratio of Peak D to Peak G ($I_D/I_G$) is above 0.7 in a Raman spectrum of the graphene.

In an embodiment, for the graphene, the intensity ratio of Peak D to Peak G ($I_D/I_G$) is above 0.9 in a Raman spectrum of the graphene.

In an embodiment, for the graphene, the intensity ratio of Peak D to Peak G ($I_D/I_G$) is 0.3~1.2 in a Raman spectrum of the graphene.

In an embodiment, the graphene is assembled into a supercapacitor, wherein an ionic liquid (EMIMBF$_4$) is used as an electrolyte. The galvanostatic charge-discharge test is performed in a voltage range of 0-3.5 V. At a charge-discharge current of 2 A g$^{-1}$, the specific capacitance of the supercapacitor is 50~200 F g$^{-1}$, e.g. 150~200 F g$^{-1}$, e.g. 52 F g$^{-1}$, 55 F g$^{-1}$, 79 F g$^{-1}$, 115 F g$^{-1}$ or 172 F g$^{-1}$; at a charge-discharge current of 100 A g$^{-1}$, the specific capacitance of the supercapacitor is 100~150 F g$^{-1}$, e.g. 125 F g$^{-1}$. At a power density of 3.5 kW kg$^{-1}$, the energy density of the supercapacitor is 20~100 Wh kg$^{-1}$, e.g. 50~100 Wh kg$^{-1}$, e.g. 22.3 Wh kg$^{-1}$, 23.5 Wh kg$^{-1}$, 33.8 Wh kg$^{-1}$, 49.1 Wh kg$^{-1}$ or 73 Wh kg$^{-1}$. For example, at a power density of 175 kW kg$^{-1}$, the energy density of the supercapacitor is 40~60 Wh kg$^{-1}$, e.g. 53 Wh kg$^{-1}$. Preferably, after 1000000 charge-discharge cycles at the current density of 100 A g$^{-1}$, the supercapacitor has a capacity retention rate of 80~95%, e.g. 90%.

In an embodiment, the graphene is assembled into a supercapacitor, wherein an ionic liquid (EMIMBF$_4$) is used as an electrolyte. The galvanostatic charge-discharge test is performed in a voltage range of 0~4 V. At a charge-discharge current of 5 A g$^{-1}$, the specific capacitance of the supercapacitor is 150~200 F g$^{-1}$, e.g. 192 F g$^{-1}$; at a charge-discharge current of 100 A g$^{-1}$, the specific capacitance of the supercapacitor is 100~150 F g$^{-1}$, e.g. 148 F g$^{-1}$. At a power density of 10 kW kg$^{-1}$, the energy density of the supercapacitor is 70~120 Wh kg$^{-1}$, e.g. 106 Wh kg$^{-1}$. For example, at a power density of 200 kW kg$^{-1}$, the energy density of the supercapacitor is 50~100 Wh kg$^{-1}$, e.g. 82 Wh kg$^{-1}$. Preferably, after 80000 charge-discharge cycles at a current density of 100 A g$^{-1}$, the supercapacitor has a capacity retention rate of 70~83%, e.g. 81%.

In an embodiment, the graphene is assembled into a supercapacitor, wherein an ionic liquid (EMIMTFSI) is used as an electrolyte. The galvanostatic charge-discharge test is performed in a voltage range of 0-3.5 V. At a charge-discharge current of 2 A g$^{-1}$, the specific capacitance of the supercapacitor is 150~200 F g$^{-1}$, e.g. 190 F g$^{-1}$; at a charge-discharge current of 100 A g$^{-1}$, the specific capacitance of the supercapacitor is 100~150 F g$^{-1}$, e.g. 143 F g$^{-1}$. At a power density of 3.5 kW kg$^{-1}$, the energy density of the supercapacitor is 70~100 Wh kg$^{-1}$, e.g. 81 Wh kg$^{-1}$; at a power density of 175 kW kg$^{-1}$, the energy density of the supercapacitor is 50~80 Wh kg$^{-1}$, e.g. 61 Wh kg$^{-1}$. After 10000 charge-discharge cycles at the current density of 100 A g$^{-1}$, the supercapacitor has a capacity retention rate of 80~90%, e.g. 89%.

In an embodiment, the graphene is assembled into a supercapacitor, wherein an ionic liquid (EMIMTFSI) is used as an electrolyte. The galvanostatic charge-discharge test is performed in a voltage range of 0~4 V. At a charge-discharge current of 5 A g$^{-1}$, the specific capacitance of the supercapacitor is 200~250 F g$^{-1}$, e.g. 244 F g$^{-1}$; at a charge-discharge current of 100 A g$^{-1}$, the specific capacitance of the supercapacitor is 150~200 F g$^{-1}$, e.g. 173 F g$^{-1}$. At a power density of 10 kW kg$^{-1}$, the energy density of the supercapacitor is 100~150 Wh kg$^{-1}$, e.g. 135 Wh kg$^{-1}$; at a power density of 200 kW kg$^{-1}$, the energy density of the supercapacitor is 80~120 Wh kg$^{-1}$, e.g. 96 Wh kg$^{-1}$. After 10000 charge-discharge cycles at the current density of 100 A g$^{-1}$, the supercapacitor has a capacity retention rate of 65~75%, e.g. 70%.

In an embodiment, the graphene is a mesoporous graphene.

In an embodiment, the graphene is prepared by the method for preparing a graphene.

BENEFICIAL EFFECTS OF INVENTION

Figure 1:
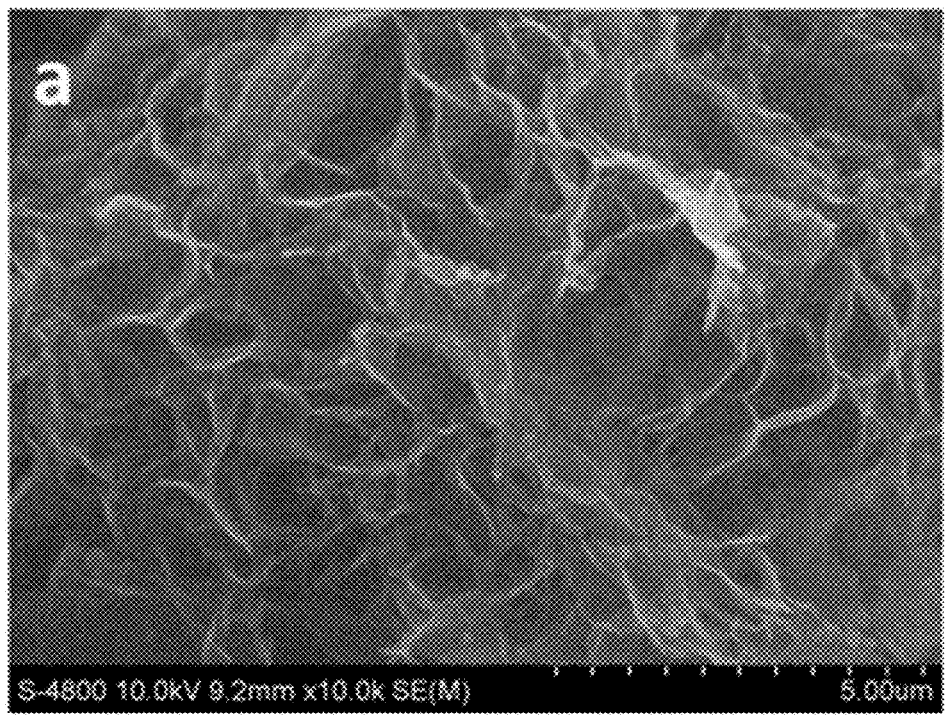
FIG. 1 is the Scanning Electron Microscope (SEM) image of the graphene of Example 1.

In the disclosed embodiments, a mixed powder of a magnesium powder and a magnesium oxide powder is used as a raw material, there are extensive sources of raw materials, the number of layers and the pore size distribution of the graphene product is regulated by adjusting the mass ratio of the magnesium powder to the magnesium oxide powder, the agglomeration and stacking of graphene can be prevented successively by a large amount of magnesium oxide during the reaction, so as to prepare a few-layer graphene. The reaction is simple and is easily carried out, has a low cost, a high yield, and no pollution, and the produced graphene has a low impurity, a high carbon-oxygen ratio, and excellent capacitance performance and electrochemical stability. The graphene in the disclosed embodiment can be directly used as an electrode material for energy storage devices such as supercapacitors, and can exhibit excellent electrical double-layer capacitance performance.

The graphene in the disclosed embodiments has one or more of the following advantages:

The graphene in the disclosed embodiments has a low oxygen content.

The graphene in the disclosed embodiments has a high electrical conductivity.

The graphene in the disclosed embodiments has a high specific surface area.

The graphene in the disclosed embodiments has a large pore volume.

The supercapacitor, wherein the graphene in the disclosed embodiments is used as an electrode, and an ionic liquid is used as an electrolyte, exhibits a high specific capacitance.

The supercapacitor, wherein the graphene in the disclosed embodiments is used as electrode, and an ionic liquid is used as an electrolyte, exhibits a high cycle capacity retention rate.

The supercapacitor, wherein the graphene in the disclosed embodiments is used as electrode, and an ionic liquid is used as an electrolyte, exhibits a high energy density.

One role of the oxide powder is to induce the growth of graphene on the surface of the oxide powder.

One role of the oxide powder is to separate graphene layers from each other as a spacer.

The graphene prepared in the disclosed embodiments is rich in meso-pores, and has a uniform pore size distribution, a controllable number of layers, no impurities, and a high carbon-oxygen atomic ratio; there are extensive sources of raw materials; and the reaction is simple and is easily to carried out, and is easy to be industrialized.

SPECIFIC MODES FOR CARRYING OUT THE INVENTION

In order to understand the purpose, technical solutions and advantages of the present invention more clearly, the present invention will be further described in detail by reference to the following drawings and examples in combination. It should be understood that the specific examples described herein are only used to explain the present invention, and are not intended to limit the present invention.

The test instruments and methods in the following examples are as follows:

Scanning electron microscopy (SEM) and energy dispersive X-ray spectroscopy (EDS) tests were performed by using a Hitachi S-4800 at an accelerating voltage of 20 kV. The graphene sample was first dispersed in ethanol, and then the ethanol dispersion droplets of the graphene was dipped on a silicon wafer for SEM analysis. Transmission electron microscopy (TEM) and HR-TEM (high resolution-TEM) tests were performed by using JEOL JEM-2010 equipped with selected area electron diffraction. The accelerating voltage tested was 200 kV. HR-TEM test with spherical aberration correction was performed by using JEOL JEM-2100 F. In the TEM test, the method for preparing a sample was as followed: the ethanol dispersion of a sample was dropped on an ultrathin and amorphous carbon-coated copper mesh, and then dried at room temperature for 1 h.

X-ray diffraction (XRD) test was performed by using a Bruker D8 multi-function X-ray diffractometer. In the instrument, a monochromatous copper K$\alpha$ radiation ($\lambda$=1.54050 Å) was used, and a scan rate of 10 degrees per minute is performed. Microscopic Raman test was performed by using a confocal Raman system (LabRam HR-800), Horiba Jobin Yvon) at an excitation wavelength of 532 nm. The position and full width at half maximum (FWMH) of the D and G bands on the Raman spectrum were determined by Lorentz fitting. X-Ray Photoelectron Spectroscopic test was performed by using PHI Quantear SXM to analyze the chemical constituents of the sample; the test was carried out at $6.7\times10^{-8}$ Pa, and Al was used as an anode probe. Electron energy loss spectroscopy (EELS) analysis were performed by using a spherical aberration-corrected JEOL JEM-2100 F TEM, and a commercial graphite powder (325 mesh) was used as a reference in the test. Method for testing conductivity was as followed: SHSG-8 mesoporous graphene powder was pressed into a sheet having a thickness of 320 μm at 6 MPa, and then the conductivity of the sheet was measured by a four-probe conductivity tester.

Thermogravimetric analysis (TGA) was performed by using a Netzsch TG 209 F3 Tarsus, under an atmosphere of $N_2$ and air, respectively, wherein the temperature was increased from 50° C. to 800° C. at 5 K min$^{-1}$. Nitrogen absorption-desorption test was performed at 77 K using a Micromeritics ASAP 2020 H D Analyzer so as to obtain the specific surface area of the graphene sample. The sample was degassed in vacuum at 150° C. for 12 h prior to the absorption-desorption test. Based on the Brunauer-Emmett-Teller (BET) theory, the value of the specific surface area could be calculated according to the adsorption amount of $N_2$ at a relative pressure $P/P_0$ of below 0.3. The pore size distribution was calculated based on the Barrett-Joyner-Halenda (BJH) model. The cumulative pore volume was obtained based on the density functional theory.

Electrochemical test: the graphene was tested for its capacitance performance as a supercapacitor electrode by a two-electrode system. The working electrode was prepared by a blade-casting method. A graphene powder (70 wt %) and a carbon black (20 wt %) was mixed in an agate mortar, and then polyvinylidene fluoride (PVDF) (10 wt %) and a few drops of N-methylpyrrolidone (NMP) were added to obtain a slurry. An aluminum foil collector was uniformly coated with the slurry by a blade-casting method (the average load of graphene was ~0.5 mg cm$^{-2}$). Then, a pressure of 6 MPa was applied to the coated aluminum foil to obtain an electrode. The electrode prepared was dried at 120° C. for 12 h, and then punched into disks having a diameter of 13 mm. Two identical electrodes and an ionic porous membrane were placed in a 2032 coin cell for further testing. Cyclic voltammetry (CV) test, electrochemical impedance spectroscopy (EIS) test and galvanostatic charge-discharge (GCD) test were performed by using BioLogic VMP3 electrochemical analyzer. The EIS test was performed from 100 MHz to 100 kHz at an amplitude of 10 mV.

Example 1

Step 1, a magnesium powder (40 g) and a magnesium oxide powder (320 g) were mixed homogeneously to obtain a mixed powder, the mixed powder was placed in a graphite square boat, and a tungsten coil were embedded in the mixed powder, wherein the magnesium powder had a purity of 99.9%, and an average particle diameter of 30 μm, and the magnesium oxide powder had a purity of 99.9%, and an average particle diameter of 50 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2\times10^{-4}$ Pa by a molecular pump, and then carbon dioxide gas with a purity of 99.9% was introduced into the sealed pressure-resistant container at a flow rate of 5000 sccm, until the pressure in the sealed pressure-resistant container was 1 MPa;

Step 3, a direct current of 3 A was applied to the two ends of the tungsten coil by using a direct current power supply, for a period of 10 s; the reaction between the magnesium powder and the carbon dioxide is initiated by heat generated from the tungsten coil; and a black powder was obtained after reaction for 1 min;

Step 4, the excessive gas in the sealed pressure-resistant container was released until the gas pressure in the container was normal pressure, and then the black powder was placed in a sufficient amount of 1 M hydrochloric acid for 10 h; the excessive magnesium oxide was removed from the product, and then the black powder was washed with deionized water by sucking filtration until the filtrate was neutral, so as to obtain a filter cake; and the filter cake was freeze-dried to obtain a mesoporous graphene powder. The mesoporous graphene powder was designated as SHSG-8.

In the Example, the magnesium powder was reacted with carbon dioxide gas according to the following equation:

$$2Mg + CO_2 \rightarrow 2MgO + C$$

FIG. 1 was a Scanning Electron Microscope (SEM) image of the mesoporous graphene obtained in Example 1. It could be observed that there were obvious gaps between the graphene layers, which separated the graphene layers from each other and resulted in clear boundaries. It demonstrated that the method in the Example could avoid the serious stacking or agglomeration between graphene layers which was prevalent during the preparation of a graphene in prior art.

Figure 2:
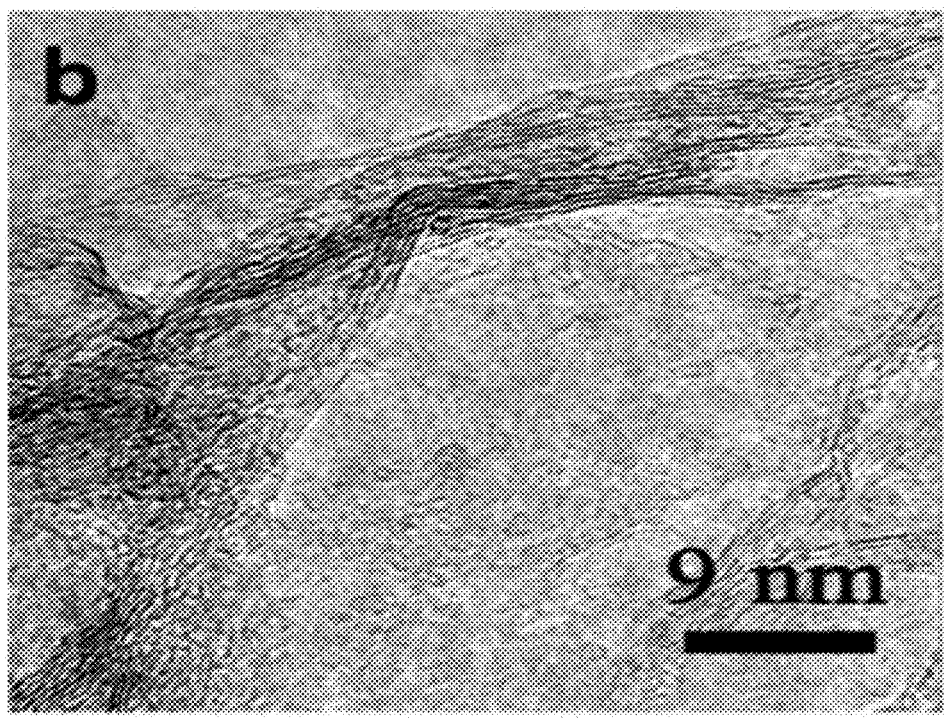
FIG. 2 is the Transmission Electron Microscope (TEM) image of the graphene of Example 1.

In addition, the mesoporous graphene in the Example was a few-layer graphene. It could be seen from the edge of the graphene layer in the TEM image as shown in FIG. 2 that the number of graphene layers prepared in the Example was below 5.

Figure 3:
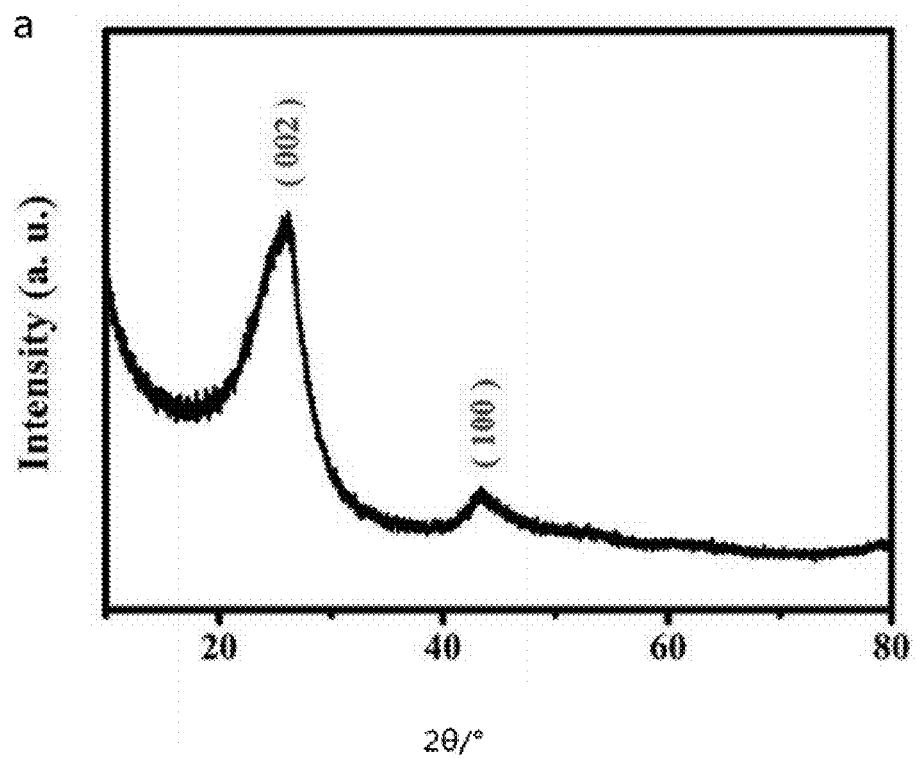
FIG. 3 is the X-Ray Diffraction pattern of the graphene of Example 1.

FIG. 3 was an X-Ray Diffraction pattern of the graphene prepared in the Example, wherein the abscissa was 2θ, and the ordinate was the diffraction intensity. It could be seen that the material had characteristic peaks (002) and (100) appeared near 26° and 43° which belonged to the graphite structure, indicating that the product had the hexagonal honeycomb lattice structure of graphene. Moreover, there was no impurity peaks that belonged to magnesium oxide or magnesium in the pattern, indicating that the graphene prepared in the Example had a high purity and had no impurities such as magnesium oxide.

Figure 4:
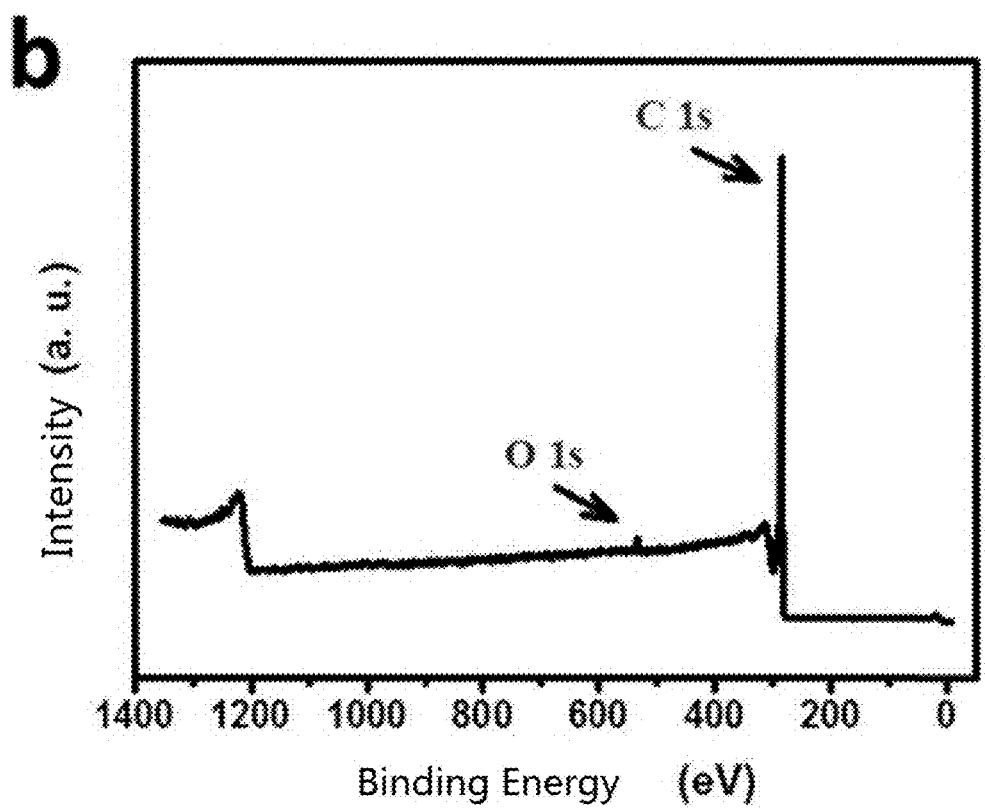
FIG. 4 is the X-Ray Photoelectron Spectroscopy of the graphene of Example 1.

FIG. 4 showed X-Ray Photoelectron Spectroscopy (XPS) of the mesoporous graphene of the Example, wherein the abscissa was the binding energy and the ordinate was the intensity. It could be seen that the main chemical constituent of the graphene prepared in the Example was carbon element, the content of oxygen element was very low, and the carbon-oxygen atomic ratio was up to 82, indicating that the graphene product had a high quality, and contained no impurity atoms.

XPS analysis result showed that SHSG-8 contained about 98.7 at % of carbon element and 1.2 at % of oxygen element. This indicated that the graphene of Example 1 had a high carbon content.

EDS analysis result also showed that SHSG-8 contained about 97.5 at % of carbon element.

Figure 5:
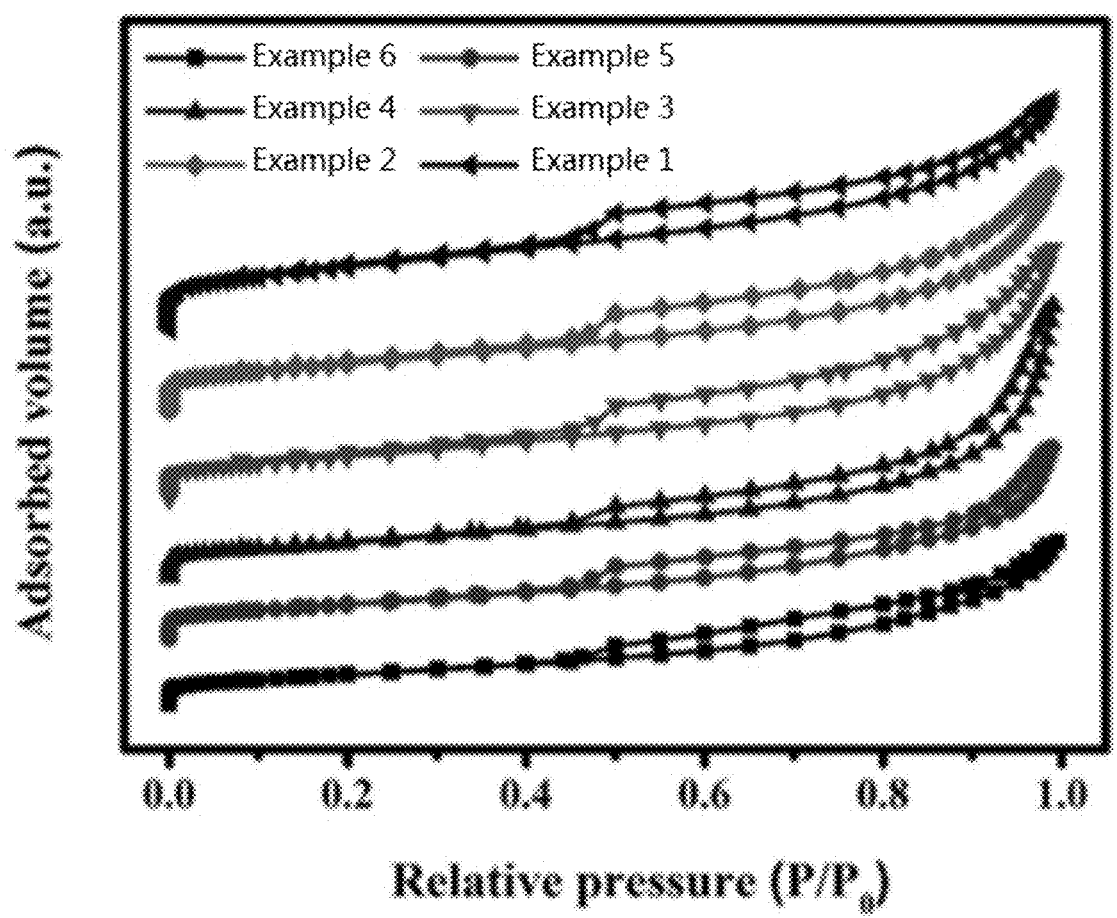
FIG. 5 shows the nitrogen adsorption-desorption isothermal curve of the graphene of Example 1, Example 2, Example 3, Example 4, Example 5 and Example 6.

In the nitrogen adsorption-desorption isothermal curves of the mesoporous graphene of Examples 1~6 as shown in FIG. 5, the abscissa was the relative pressure, and the ordinate was the gas absorption amount. The nitrogen adsorption-desorption isothermal curve of the graphene prepared in the Example had a hysteresis loop, which is peculiar to mesoporous materials, when $P/P_0$ was in a range of 0.4-0.9. The mesoporous graphene of the Example had a specific surface area of up to 709 $m^2g^{-1}$, and a pore volume of up to 1.52 $cm^3g^{-1}$, demonstrating that it had a mesopore-rich structure and a large specific surface area.

Figure 6:
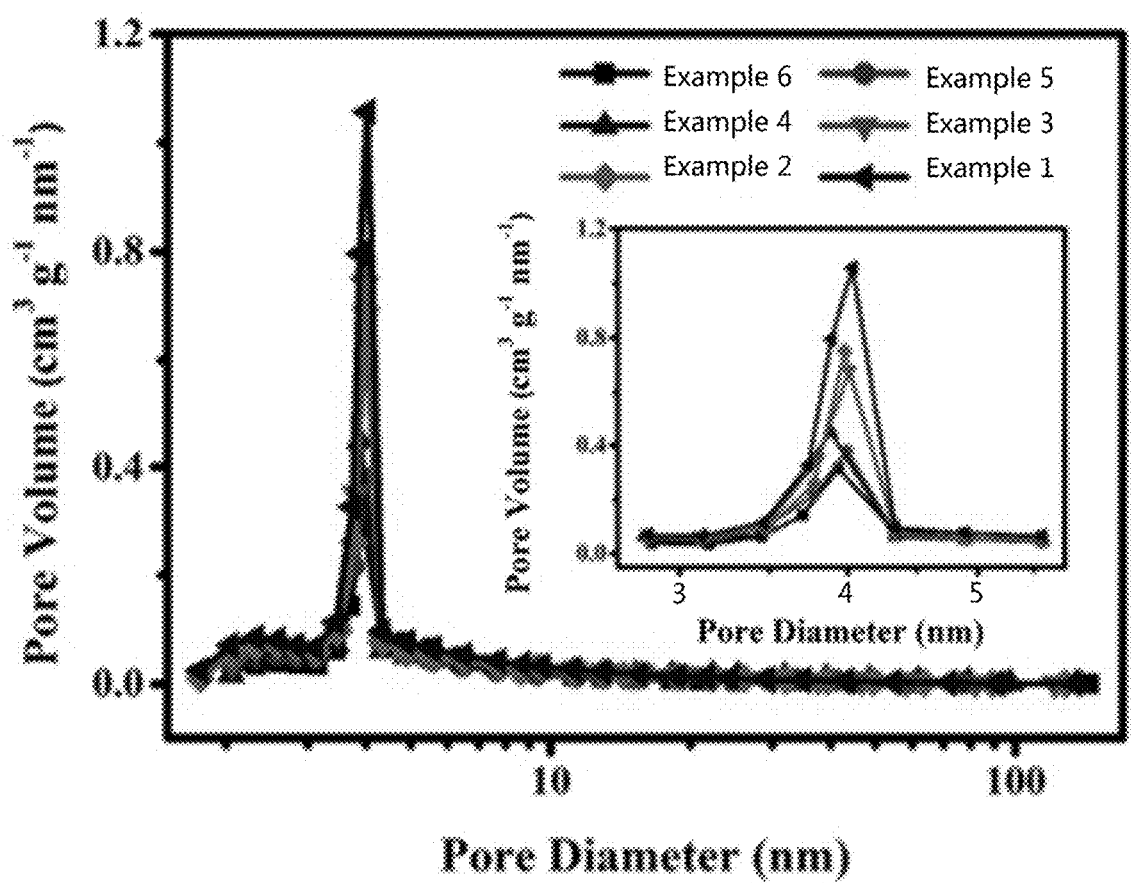
FIG. 6 shows the pore size distribution curve of the graphene of Example 1, Example 2, Example 3, Example 4, Example 5 and Example 6 obtained by nitrogen adsorption-desorption isothermal test.

FIG. 6 showed a pore size distribution curves of the graphene prepared in Examples 1~6, wherein the abscissa was the pore size, and the ordinate was the pore volume. It could be clearly observed that the material exhibited a unimodal pore size distribution at about 4 nm, indicating that the product had a highly uniform mesoporous channel. The graphene of Examples 1~6 had a peak width of less than 1 nm and a FWHM of less than 1 nm in the pore size distribution curves.

Figure 7:
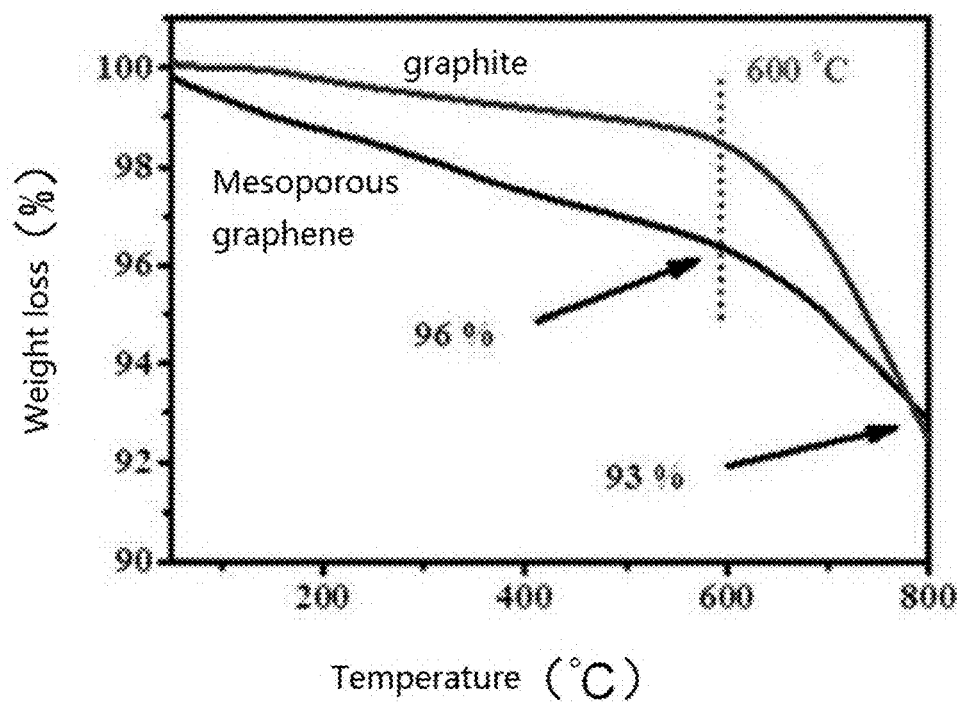
FIG. 7 shows the thermogravimetric curve of the graphene of Example 1 and the commercial graphite powder under an atmosphere of nitrogen.

FIG. 7 showed a comparison of the thermogravimetric curve between the mesoporous graphene prepared in the Example and the commercial graphite powder under an atmosphere of nitrogen, wherein the abscissa was the temperature, and the ordinate was the weight loss. It could be observed that the graphene prepared in the Example had a lower weight loss than the commercial graphite powder at a high temperature ranging from 600 to 800□, indicating that the graphene prepared in the Example had excellent thermal stability. As shown in the figure, the weight of the graphene of the Example reduced from 96% to 93% when the temperature was increased from 600 to 800° C.

Figure 8:
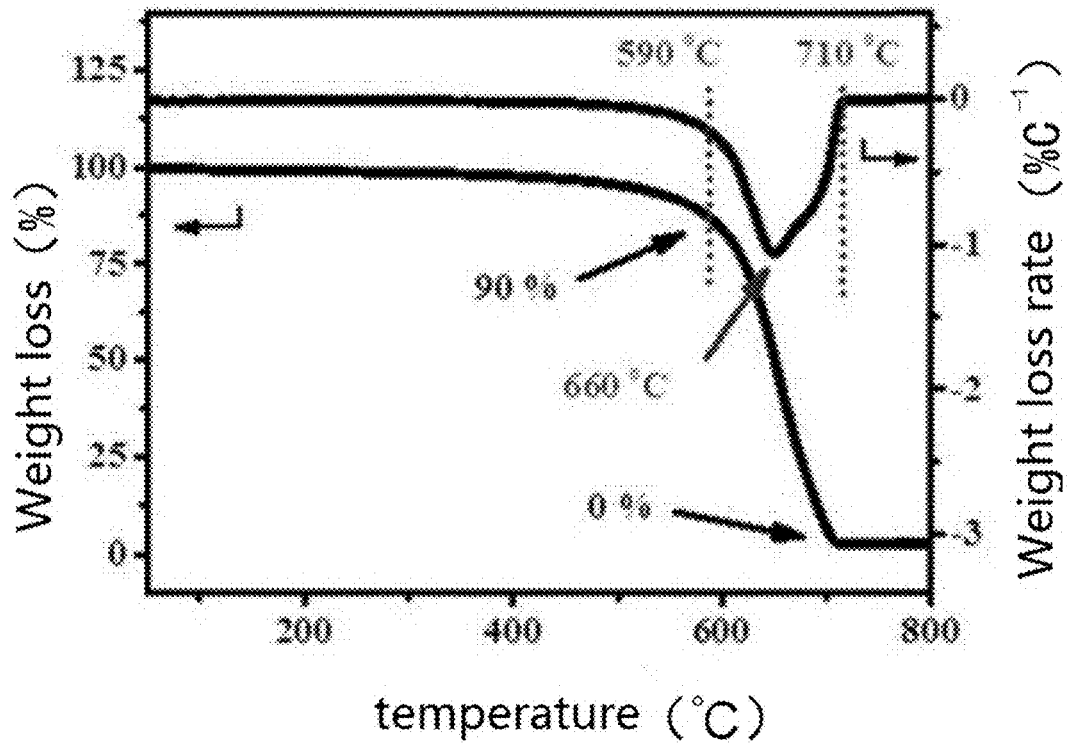
FIG. 8 shows the thermogravimetric curve of the graphene of Example 1 under an atmosphere of air.

FIG. 8 showed a thermogravimetric curve of the mesoporous graphene prepared in the Example under an atmosphere of air, wherein, the abscissa was the temperature, the left ordinate was the weight loss, and the right ordinate was the weight loss rate. It could be seen from the curve that the weight loss was 100% when the temperature was increased to 800° C., indicating that the product had an extremely high purity, and contained very few impurities. It also showed that the magnesium powder and the magnesium oxide powder used in the preparation method of the Example could be completely removed during the post-treatment. In the figure, 590° C. was the starting temperature for thermal weight loss, 660° C. was the temperature at which the thermal weight loss rate reached a peak value, 710° C. was the temperature at which the weight loss rate was 0 again, and 90% was the mass fraction of the remaining product measured at 590° C. in the thermogravimetric test.

FIGS. 9-14 showed an electrochemical performance of the mesoporous graphene produced in the Example as a supercapacitor electrode in an ionic liquid. The ionic liquid was 1-ethyl-3-methylimidazolium tetrafluoroborate ($EMIMBF_4$).

Figure 9:
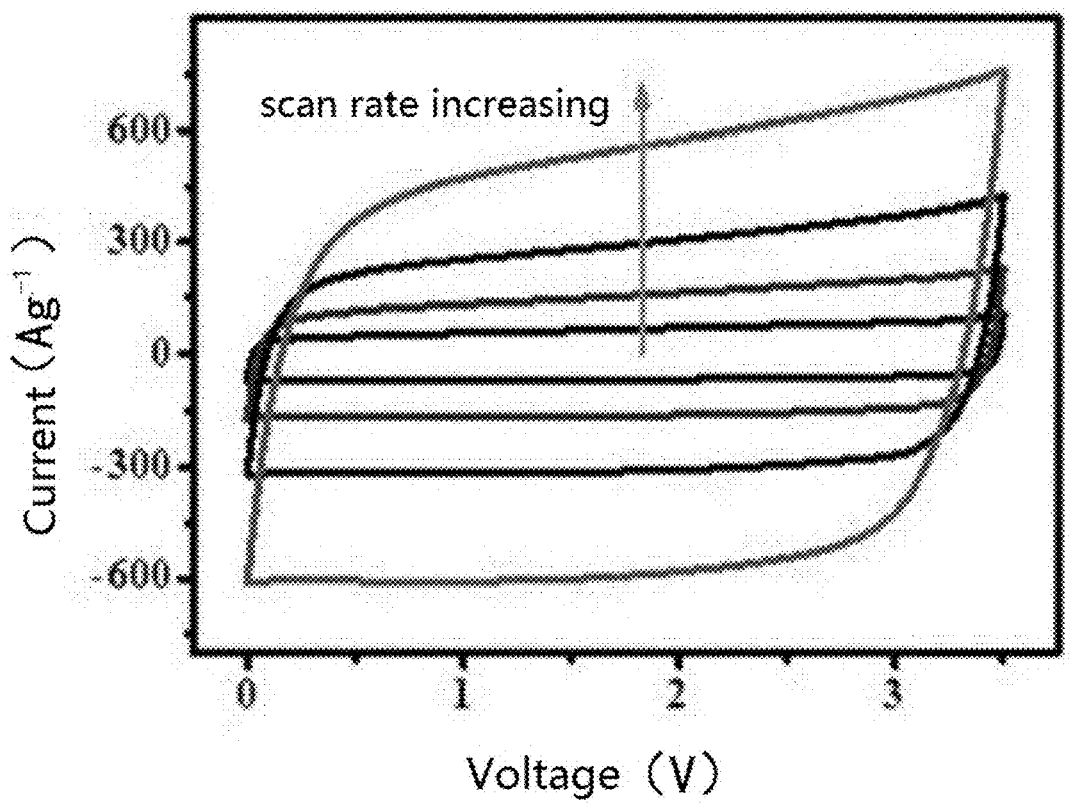
FIG. 9 shows the cyclic voltammetry curve of the graphene of Example 1 in an ionic liquid, wherein the scan rate is 2000, 5000, 10000, and 20000 mV s$^{-1}$, respectively.

FIG. 9 showed a cyclic voltammetry curve of the graphene of Example 1 in an ionic liquid, wherein the scan rate was 2000 mV $s^{-1}$, 5000 mV $s^{-1}$, 10000 mV $s^{-1}$, and 20000 mV $s^{-1}$, respectively, wherein the abscissa was voltage, the ordinate was current, and the direction of the arrow indicated that the scan rate was increasing. At a scan rate up to 2000 mV $s^{-1}$, the cyclic voltammetry curve of the material exhibited a nearly standard rectangle with no redox peaks. When the scan rate was continuously increased to 20000 mV $s^{-1}$, the cyclic voltammetry curve still maintained a rectangular shape, demonstrating that the material prepared in the Example had excellent electrical double-layer capacitance performance.

Figure 10:
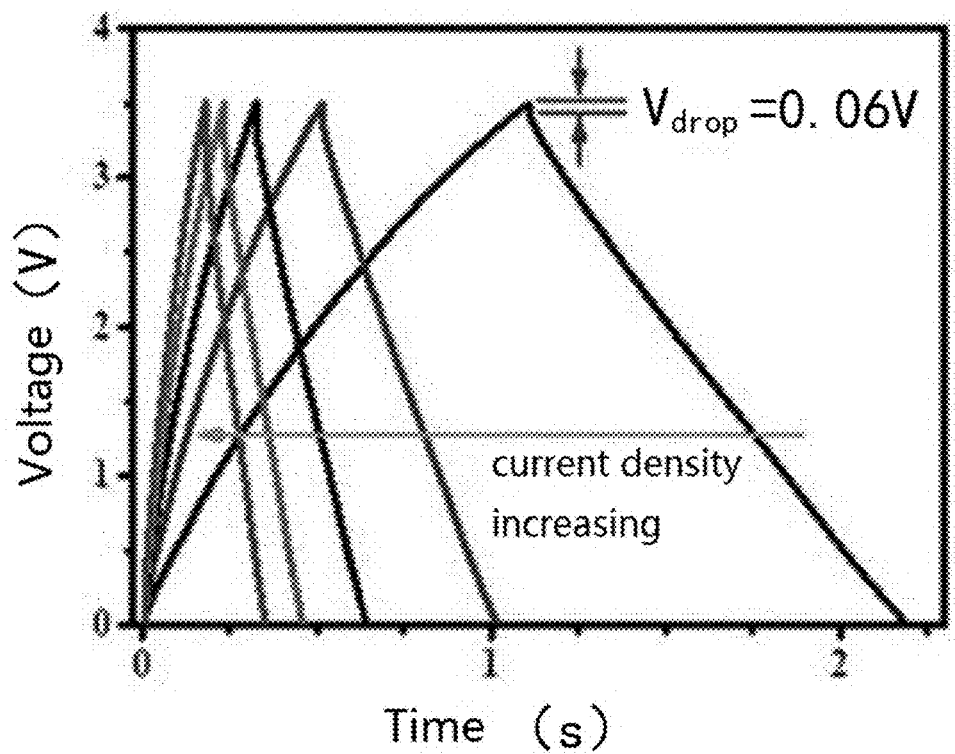
FIG. 10 shows the charge-discharge curve of the graphene of Example 1 in an ionic liquid, wherein the charge-discharge current density is 100, 200, 300, 400, and 500 A g$^{-1}$, respectively.

FIG. 10 showed a galvanostatic charge-discharge curve (GCD curve) of the graphene of Example 1 (SHSG-8) in an ionic liquid ($EMIMBF_4$), wherein the charge-discharge current density was 100 A $g^{-1}$, 200 A $g^{-1}$, 300 A $g^{-1}$, 400 A $g^{-1}$, and 500 A $g^{-1}$, respectively, wherein the abscissa was time, the ordinate was voltage, and the direction of the arrow indicated that current density was increasing. It could be observed that in the voltage range of 0-3.5 V, the charge-discharge curve made up a symmetrical triangle, indicating that the graphene prepared in the Example had good capacitance behavior, and was suitable as supercapacitor electrode materials. The GCD curve exhibited a voltage drop of 0.06 V at the starting point of the discharge curve at the current of 100 $Ag^{-1}$, indicating that the supercapacitor had low equivalent series resistance (ESR), excellent power capacity and low resistance.

Figure 11:
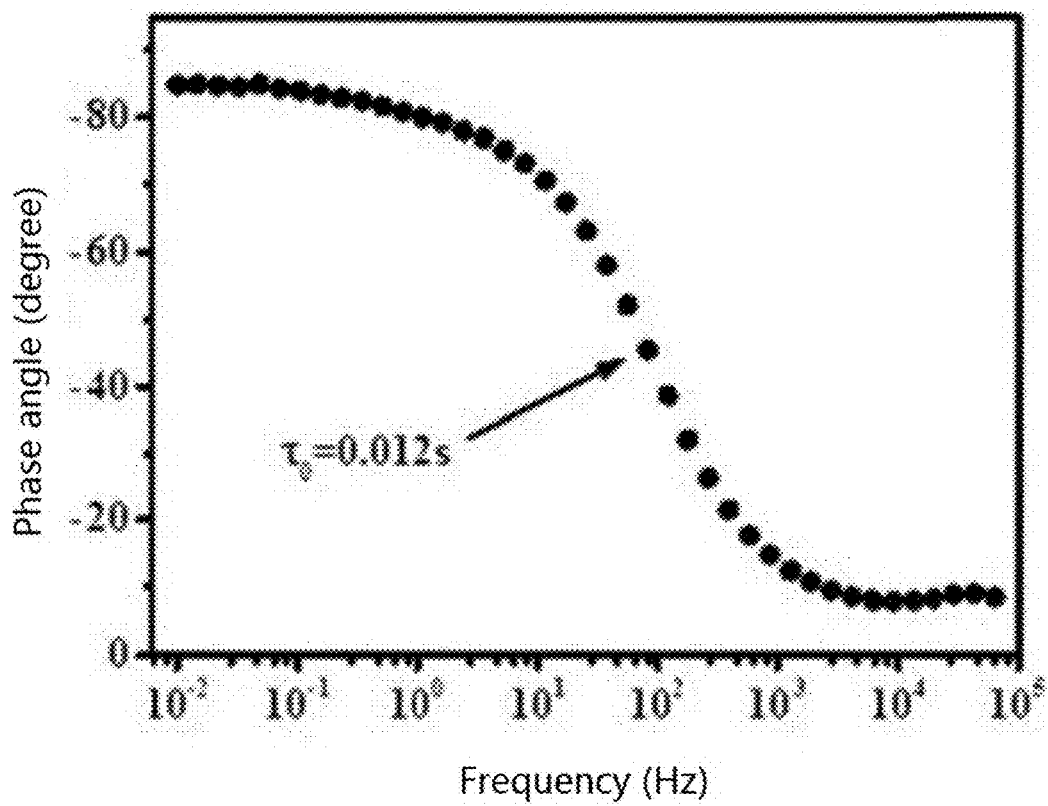
FIG. 11 is the Bode diagram of the graphene of Example 1 in an ionic liquid.

FIG. 11 was a Bode diagram of the graphene of Example 1 in the ionic liquid ($EMIMBF_4$), wherein the abscissa was the frequency, and the ordinate was the phase angle. It could be found that the material had excellent frequency response characteristics, and the relaxation time constant ($\tau_0$) was as low as 0.012 s, indicating that when the graphene of Example 1 is used as an electrode, an electric double layer could quickly and efficiently be formed on the surface of the electrode, i.e. the electrode had a characteristic of storage energy in fast speed.

Figure 12:
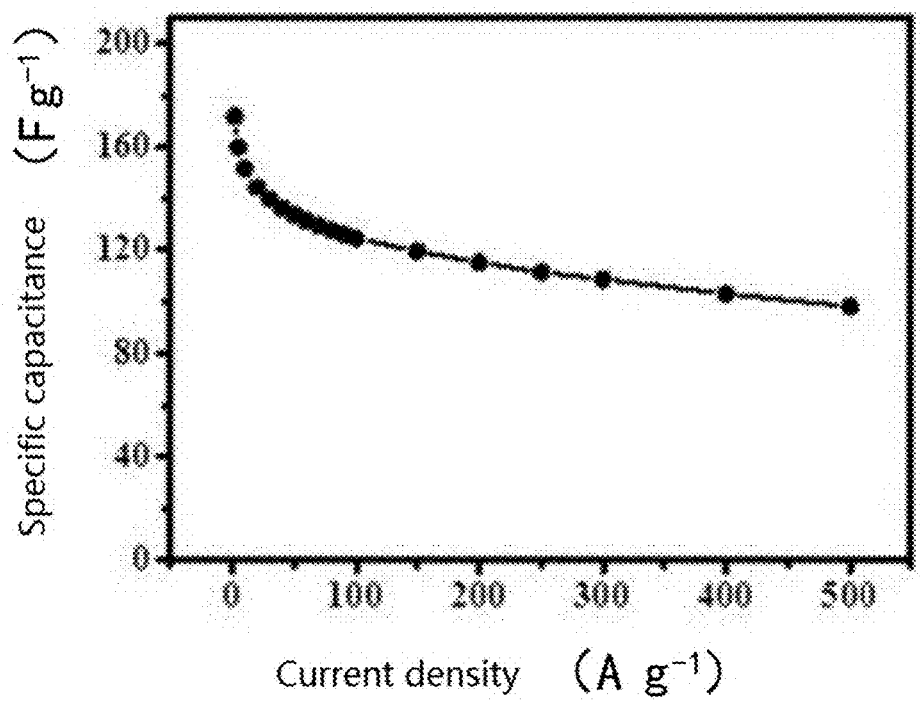
FIG. 12 shows the rate characteristic curve of the graphene of Example 1 in an ionic liquid.

FIG. 12 was a rate characteristic curve of the graphene of Example 1 in an ionic liquid EMIMBF$_4$, wherein the abscissa was the current density, and the ordinate was the specific capacitance. When the charge-discharge current density was 2 A g$^{-1}$, the material had a capacity of up to 180 F g$^{-1}$, and when the current density was continuously increased to 500 A g$^{-1}$, the material could still maintain a capacity of 100 F g$^{-1}$. The results above demonstrated that the graphene of Example 1 could be used as an electrode material for high current supercapacitors. Since the mesoporous graphene material of the Example had excellent capacitance performance and rate characteristic, and therefore, the electrode prepared by the graphene could exhibit an excellent energy density and power density.

Figure 13:
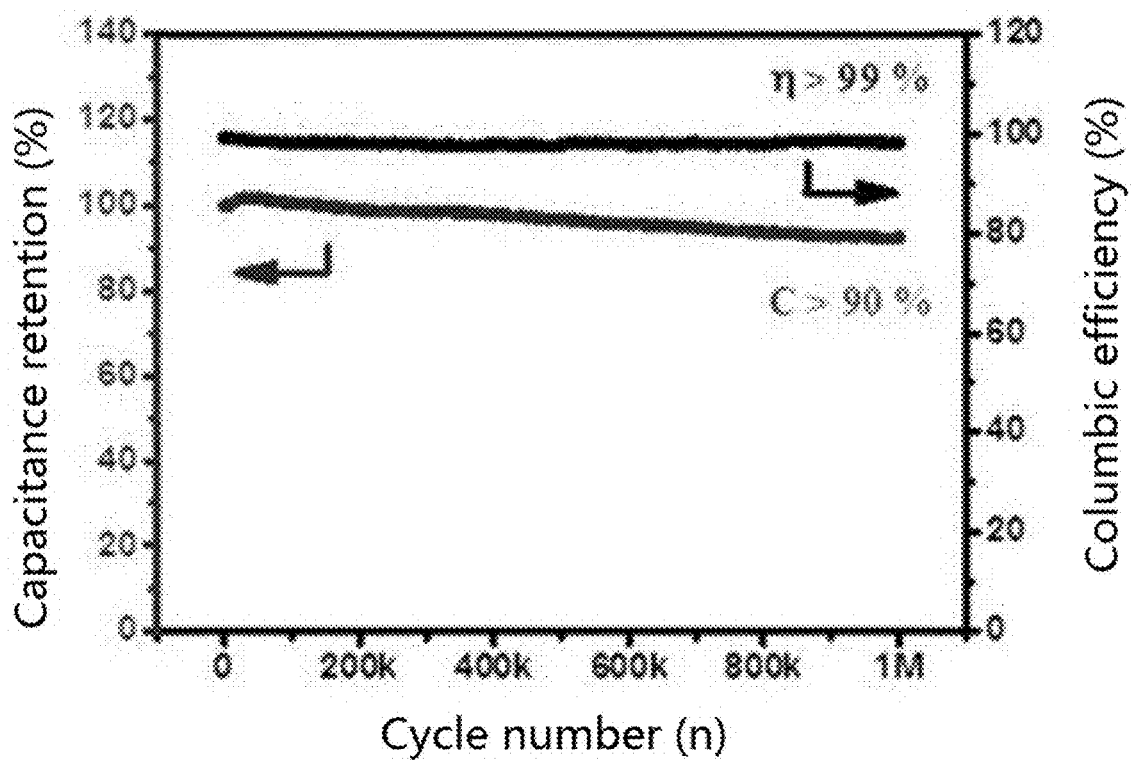
FIG. 13 is the Ragone diagram of the graphene of Example 1 in an ionic liquid.

FIG. 13 showed a Ragone diagram of the graphene of Example 1 in an ionic liquid (EMIMBF$_4$), wherein the abscissa represents the power density, and the ordinate was the energy density. It could be seen from the figure that when the power density was 3.5 kW kg$^{-1}$, the electrode based on the graphene prepared in the Example had an energy density of up to 73 Wh kg$^{-1}$. More importantly, when the electrode worked at a power density of up to 875 kW kg$^{-1}$, an energy density of 42 Wh kg$^{-1}$ could still be achieve, indicating that the graphene material prepared in the Example also had the characteristic of a high energy density and a high power density. In addition, the mesoporous graphene prepared in the Example had excellent cycle stability.

Figure 14:
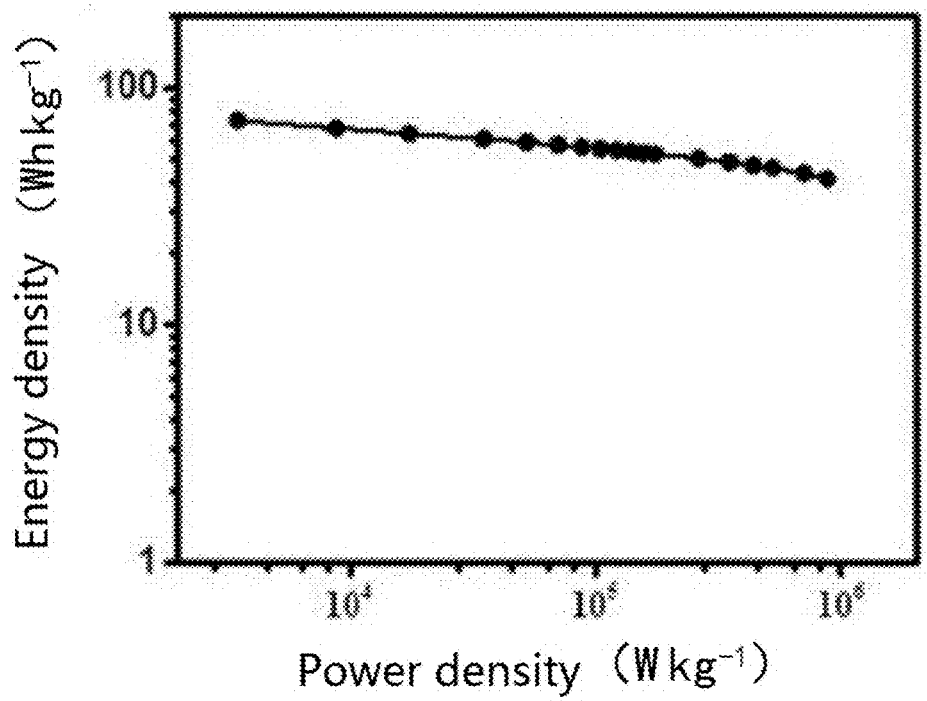
FIG. 14 shows the cycle capacity curve of the graphene of Example 1 in an ionic liquid.

FIG. 14 showed a cycle capacity curve of the graphene of Example 1 in an ionic liquid (EMIMBF$_4$), wherein the abscissa was the number of cycles, the left ordinate was the capacity retention rate, and the right ordinate was the coulomb efficiency. After working at a charge-discharge current of up to 100 A g$^{-1}$ for 1 million cycles, i.e. after working for 600 hours continuously, the material could still maintain 90% of the initial energy. After 1 million cycles, the coulomb efficiency of the electrode was still greater than 99%.

The electrochemical characterization results in FIGS. 9-14 above showed that the graphene of Example 1, when used as a supercapacitor electrode, exhibited a high capacitance value, a good rate characteristic, an extremely high energy density and power density, and an excellent cycle stability in the ionic liquid EMIMBF4, which further indicated that the graphene of Example 1 could be applied as an electrode material for high-power, high-current supercapacitors.

The graphene of Example 1 (SHSG-8) was assembled into a supercapacitor by the above-mentioned method, wherein an ionic liquid (EMIMBF$_4$) was used as an electrolyte. The galvanostatic charge-discharge test was performed in the voltage range of 0-3.5 V. Preferably, at a charge-discharge current of 2 A g$^{-1}$, the supercapacitor had a specific capacitance of 172 F g$^{-1}$. Preferably, at a charge-discharge current of 100 A g$^{-1}$, the supercapacitor had a specific capacitance of 125 F g$^{-1}$. Preferably, at a power density of 3.5 kW kg$^{-1}$, the supercapacitor had an energy density of 73 Wh kg$^{-1}$. Preferably, at a power density of 175 kW kg$^{-1}$, the supercapacitor had an energy density of 53 Wh kg$^{-1}$. Preferably, after 1000000 charge-discharge cycles at the current density of 100 A g$^{-1}$, the supercapacitor had a capacity retention rate of 90%.

The graphene of Example 1 (SHSG-8) was assembled into a supercapacitor by the above-mentioned method, wherein an ionic liquid (EMIMBF$_4$) was used as an electrolyte. The galvanostatic charge-discharge test was performed in the voltage range of 0-4 V. Preferably, at a charge-discharge current of 5 A g$^{-1}$, the supercapacitor had a specific capacitance of 192 F g$^{-1}$. Preferably, at a charge-discharge current of 100 A g$^{-1}$, the supercapacitor had a specific capacitance of 148 F g$^{-1}$. Preferably, at a power density of 10 kW kg$^{-1}$, the supercapacitor had an energy density of 106 Wh kg$^{-1}$. Preferably, at a power density of 200 kW kg$^{-1}$, the supercapacitor had an energy density of 82 Wh kg$^{-1}$. Preferably, after 80000 charge-discharge cycles at the current density of 100 A g$^{-1}$, the supercapacitor had a capacity retention rate of 81%.

The graphene of Example 1 (SHSG-8) was assembled into a supercapacitor by the above-mentioned method, wherein an ionic liquid (EMIMTFSI) was used as an electrolyte. The galvanostatic charge-discharge test was performed in the voltage range of 0-3.5 V. Preferably, at a charge-discharge current of 2 A g$^{-1}$, the supercapacitor had a specific capacitance of 190 F g$^{-1}$. Preferably, at a charge-discharge current of 100 A g$^{-1}$, the supercapacitor had a specific capacitance of 143 F g$^{-1}$. Preferably, at a power density of 3.5 kW kg$^{-1}$, the supercapacitor had an energy density of 81 Wh kg$^{-1}$. Preferably, at a power density of 175 kW kg$^{-1}$, the supercapacitor had an energy density of 61 Wh kg$^{-1}$. Preferably, after 10000 charge-discharge cycles at the current density of 100 A g$^{-1}$, the supercapacitor had a capacity retention rate of 89%.

The graphene of Example 1 (SHSG-8) was assembled into a supercapacitor by the above-mentioned method, wherein an ionic liquid (EMIMTFSI) was used as an electrolyte. The galvanostatic charge-discharge test was performed in a voltage range of 0-4 V. Preferably, at a charge-discharge current of 5 A g$^{-1}$, the supercapacitor had a specific capacitance of 244 F g$^{-1}$. Preferably, at a charge-discharge current of 100 A g$^{-1}$, the supercapacitor had a specific capacitance of 173 F g$^{-1}$. Preferably, at a power density of 10 kW kg$^{-1}$, the supercapacitor had an energy density of 135 Wh kg$^{-1}$. Preferably, at a power density of 200 kW kg$^{-1}$, the supercapacitor had an energy density of 96 Wh kg$^{-1}$. Preferably, after 10000 charge-discharge cycles at the current density of 100 A g$^{-1}$, the supercapacitor had a capacity retention rate of 70%.

The graphene of Example 1 had an electrical conductivity of 13000 S m$^{-1}$.

Example 2

Step 1, a magnesium powder (8 g) and a magnesium oxide powder (48 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 1 000 μm, and the magnesium oxide powder had a purity of 99.9%, and an average particle diameter of 1000 μm;

Step 2, the graphite square boat containing the mixed powder and tungsten coil in Step 1 was placed in a sealed pressure-resistant steel container with a volume of 24 L; the pressure of the sealed pressure-resistant container was reduced to 2×10$^{-4}$ Pa by a molecular pump, and then carbon dioxide gas with a purity of 99.9% was introduced into the sealed pressure-resistant container at a flow rate of 10000 sccm until the pressure in the sealed pressure-resistant container was 1 MPa;

Step 3, a direct current of 30 A was applied to the two ends of the tungsten coil by using a direct current power supply, for a period of 5 s, and a reaction between the magnesium powder and the carbon dioxide was initiated by heat generated from the tungsten coil and proceeded in a self-sustaining manner; and a black powder was obtained after reaction for 2 min;

Step 4, the excessive gas in the sealed pressure-resistant container was released until the gas pressure in the container was normal pressure, and then the black powder was placed in a sufficient amount of 1 M hydrochloric acid for 6 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder. The mesoporous graphene powder was designated as SHSG-6.

As shown in FIGS. 5 and 6, the graphene (SHSG-6) prepared in Example 2 had a specific surface area of 700 $m^2g^{-1}$, a pore volume of 1.16~1.55 $cm^3g^{-1}$, and the pore size distribution centered at about 4 nm.

The graphene (SHSG-6) of Example 2 was assembled into a supercapacitor by the above-mentioned method, wherein an ionic liquid (EMIMBF$_4$) was used as an electrolyte. The galvanostatic charge-discharge test was performed in the voltage range of 0-3.5 V. At a charge-discharge current of 2 A $g^{-1}$, the specific capacitance of the supercapacitor was 115 F $g^{-1}$. At a power density of 3.5 kW $kg^{-1}$, the energy density of the supercapacitor was 49.1 Wh kg.

Example 3

Step 1, a magnesium powder (8 g) and a magnesium oxide powder (32 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 1 μm, and the magnesium oxide powder had a purity of 99.9%, and an average particle diameter of 0.1 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2 \times 10^{-4}$ Pa by a molecular pump, and then carbon dioxide gas with a purity of 99.9% was introduced into the sealed pressure-resistant container at a flow rate of 100 sccm, until the pressure in the sealed pressure-resistant container was 0.5 MPa;

Step 3, a direct current of 3 A was applied to the two ends of the tungsten coil by using a direct current power supply, for a period of 30 s; the reaction between the magnesium powder and the carbon dioxide was initiated by heat generated from the tungsten coil and proceeded in a self-sustaining manner, and a black powder was obtained after reaction for 1.5 min;

Step 4, the excessive gas in the sealed pressure-resistant container was released until the gas pressure in the container was normal pressure, and then the black powder was placed in a sufficient amount of 2 M nitric acid for 48 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder. The mesoporous graphene powder was designated as SHSG-4.

As shown in FIGS. 5 and 6, the graphene (SHSG-4) prepared in Example 3 had a specific surface area of 516 $m^2g^{-1}$, a pore volume of 1.12~1.16 $cm^3g^{-1}$, and the pore size distribution centered at about 4 nm.

The graphene (SHSG-4) of Example 3 was assembled into a supercapacitor by the above-mentioned method, wherein an ionic liquid (EMIMBF$_4$) was used as an electrolyte. The galvanostatic charge-discharge test was performed in the voltage range of 0-3.5 V. At a charge-discharge current of 2 A $g^{-1}$, the specific capacitance of the supercapacitor was 79 F $g^{-1}$. At a power density of 3.5 kW $kg^{-1}$, the energy density of the supercapacitor was 33.8 Wh $kg^{-1}$.

Example 4

Step 1, a magnesium powder (8 g) and a magnesium oxide powder (16 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 300 μm, and the magnesium oxide powder had a purity of 99.9%, and an average particle diameter of 500 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2 \times 10^{-4}$ Pa by a molecular pump, and then carbon dioxide gas with a purity of 99.9% was introduced into the sealed pressure-resistant container at a flow rate of 200 sccm until the pressure in the sealed pressure-resistant container was 10 MPa;

Step 3, a direct current of 10 A was applied to the two ends of the tungsten coil by using a direct current power supply, for a period of 15 s; the reaction between the magnesium powder and the carbon dioxide was initiated by heat generated from the tungsten coil and proceeded in a self-sustaining manner, and a black powder was obtained after reaction for 1.5 min;

Step 4, the excessive gas in the sealed pressure-resistant container was released until the gas pressure in the container was normal pressure, and then the black powder was placed in a sufficient amount of 1 M sulphuric acid for 24 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder. The mesoporous graphene powder was designated as SHSG-2.

As shown in FIGS. 5 and 6, the graphene (SHSG-2) prepared in Example 4 had a specific surface area of 469 $m^2g^{-1}$, a pore volume of 1.03~1.12 $cm^3g^{-1}$, and the pore size distribution centered at about 4 nm.

The graphene (SHSG-2) of Example 4 was assembled into a supercapacitor by the above-mentioned method, wherein an ionic liquid (EMIMBF$_4$) was used as an electrolyte. The galvanostatic charge-discharge test was performed in the voltage range of 0-3.5 V. At a charge-discharge current of 2 A $g^{-1}$, the specific capacitance of the supercapacitor was 55 F $g^{-1}$. At a power density of 3.5 kW $kg^{-1}$, the energy density of the supercapacitor was 23.5 Wh $kg^{-1}$.

Example 5

Step 1, a magnesium powder (8 g) and a magnesium oxide powder (8 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 30 µm, and the magnesium oxide powder had a purity of 99.9%, and an average particle diameter of 50 µm;

Step 2, the graphite square boat containing the mixed powder and tungsten coil in Step 1 was placed in a sealed pressure-resistant steel container with a volume of 24 L, the pressure of the sealed pressure-resistant container was reduced to $2\times10^{-4}$ Pa by a molecular pump, and then carbon dioxide gas with a purity of 99.9% was introduced into the sealed pressure-resistant container at a flow rate of 5000 sccm, until the pressure in the sealed pressure-resistant container was 5 MPa;

Step 3, a direct current of 15 A was applied to the two ends of the tungsten coil by using a direct current power supply, for a period of 20 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released, until the gas pressure in the container was normal pressure, and then the black powder was placed in a sufficient amount of 1 M hydrochloric acid for 36 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder. The mesoporous graphene powder was designated as SHSG-1.

As shown in FIGS. 5 and 6, the graphene (SHSG-1) prepared in Example 5 had a specific surface area of 401 $m^2g^{-1}$, and a pore volume of 0.83~1.03 $cm^3g^{-1}$, and the pore size distribution centered at about 4 nm.

The graphene (SHSG-1) of Example 4 was assembled into a supercapacitor by the above-mentioned method, wherein an ionic liquid (EMIMBF$_4$) was used as an electrolyte. The galvanostatic charge-discharge test was performed in the voltage range of 0-3.5 V. At a charge-discharge current of 2 A $g^{-1}$, the specific capacitance of the supercapacitor was 52 F $g^{-1}$. At a power density of 3.5 kW $kg^{-1}$, the energy density of the supercapacitor was 22.3 Wh $kg^{-1}$.

Example 6

Step 1, a magnesium powder (8 g) was placed in a graphite square boat, and tungsten coil were embedded in the magnesium powder, wherein the magnesium powder had a purity of 99.9%, and an average particle diameter of 30 µm;

Step 2, the graphite square boat containing the magnesium powder and tungsten coil in Step 1 was placed in a sealed pressure-resistant steel container with a volume of 24 L, the pressure of the sealed pressure-resistant container was reduced to $2\times10^{-4}$ Pa by a molecular pump, and then carbon dioxide gas with a purity of 99.9% was introduced into the sealed pressure-resistant container at a flow rate of 5000 sccm, until the pressure in the sealed pressure-resistant container was 0.125 MPa;

Step 3, a direct current of 1 A was applied to the two ends of the tungsten coil by using a direct current power supply, for a period of 25 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released, until the gas pressure in the container was normal pressure, and then the black powder was placed in a sufficient amount of 1 M hydrochloric acid for 12 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder. The mesoporous graphene powder was designated as SHSG-0.

As shown in FIGS. 5 and 6, the graphene (SHSG-0) prepared in Example 6 had a specific surface area of 364 $m^2g^{-1}$, a pore volume of 0.73~0.83 $cm^3g^{-1}$, and the pore size distribution centered at about 4 nm.

The graphene (SHSG-0) of Example 4 was assembled into a supercapacitor by the above-mentioned method, wherein an ionic liquid (EMIMBF$_4$) was used as an electrolyte. The galvanostatic charge-discharge test was performed in the voltage range of 0-3.5 V. At a charge-discharge current of 2 A $g^{-1}$, the specific capacitance of the supercapacitor was 30 F $g^{-1}$. At a power density of 3.5 kW $kg^{-1}$, the energy density of the supercapacitor was 12.7 Wh $kg^{-1}$.

In the Raman spectrum of the graphene of Examples 1~6, the intensity ratio of Peak D to Peak G ($I_D/I_G$) was shown in Table 1. $I_D/I_G$ was increased from 0.158 for SHSG-0 to 1.126 for SHSG-8.

TABLE 1

| graphene | $I_D/I_G$ |
|---|---|
| SHSG-8 | 1.126 |
| SHSG-6 | 1.110 |
| SHSG-4 | 1.102 |
| SHSG-2 | 0.766 |
| SHSG-1 | 0.306 |
| SHSG-0 | 0.158 |

Example 7

Step 1, a magnesium powder (8 g) and a magnesium oxide powder (80 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 30 µm, and the magnesium oxide powder had a purity of 99.9%, and an average particle diameter of 50 µm;

Step 2, the graphite square boat containing the mixed powder and tungsten coil in Step 1 was placed in a sealed pressure-resistant steel container with a volume of 24 L, the pressure of the sealed pressure-resistant container was reduced to $2\times10^{-4}$ Pa by a molecular pump, and then carbon dioxide gas with a purity of 99.9% was introduced into the sealed pressure-resistant container at a flow rate of 5000 sccm, until the pressure in the sealed pressure-resistant container was 0.125 MPa;

Step 3, a direct current of 3 A was applied to the two ends of the tungsten coil by using a direct current power supply, for a period of 15 s; the reaction between the magnesium powder and the carbon dioxide was initiated by heat generated from the tungsten coil and proceeded in a self-sustaining manner, and a black powder was obtained after reaction for 1.5 min;

Step 4, the excessive gas in the sealed pressure-resistant container was released, until the gas pressure in the container was normal pressure, and then the black powder was placed in a sufficient amount of 1 M hydrochloric acid for 20 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 8

Step 1, a magnesium powder (8 g) and a magnesium oxide powder (64 g) were mixed homogeneously to obtain a mixed powder were placed in a graphite square boat, and tungsten coil were embedded in the mixed powder, wherein the magnesium powder has a purity of 99.9%, and an average particle diameter of 30 μm, and the magnesium oxide powder has a purity of 99.9%, and an average particle diameter of 50 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2 \times 10^{-4}$ Pa by a molecular pump, and then carbon dioxide gas with a purity of 99.9% was introduced into the sealed pressure-resistant container at a flow rate of 5000 sccm, until the pressure in the sealed pressure-resistant container was 0.25 MPa;

Step 3, a direct current of 3 A was applied to the two ends of the tungsten coil by using a direct current power supply, for a period of 20 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released, until the gas pressure in the container was normal pressure, and then the black powder was placed in a sufficient amount of 1 M hydrochloric acid for 18 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 9

Step 1, a magnesium powder (8 g) and a magnesium oxide powder (64 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 600 μm, and the magnesium oxide powder had a purity of 99.9%, and an average particle diameter of 200 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2 \times 10^{-4}$ Pa by a molecular pump, and then carbon dioxide gas with a purity of 99.9% was introduced into the sealed pressure-resistant container at a flow rate of 5000 sccm, until the pressure in the sealed pressure-resistant container was 0.5 MPa;

Step 3, a direct current of 18 A was applied to the two ends of the tungsten coil by using a direct current power supply, for a period of 10 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released, until the gas pressure in the container was normal pressure, and then the black powder was placed in a sufficient amount of 1 M hydrochloric acid for 10 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 10

Step 1, a magnesium powder (8 g) and a magnesium oxide powder (64 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 30 μm, and the magnesium oxide powder had a purity of 99.9%, and an average particle diameter of 50 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2 \times 10^{-4}$ Pa by a molecular pump, and then carbon dioxide gas with a purity of 99.9% was introduced into the sealed pressure-resistant container at a flow rate of 2000 sccm, until the pressure in the sealed pressure-resistant container was 2 MPa;

Step 3, a direct current of 3 A was applied to the two ends of the tungsten coil by using a direct current power supply, for a period of 15 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released, until the gas pressure in the container was normal pressure, and then the black powder was placed in a sufficient amount of 1 M hydrochloric acid for 20 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 11

Step 1, a magnesium powder (8 g) and a magnesium oxide powder (64 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 30 μm, and the magnesium oxide powder had a purity of 99.9%, and an average particle diameter of 50 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2 \times 10^{-4}$ Pa by a molecular pump, and then carbon dioxide gas with a purity of 99.9% was introduced into the sealed pressure-resistant container at a flow rate of 1000 sccm, until the pressure in the sealed pressure-resistant container was 5 MPa;

Step 3, a direct current of 3 A was applied to the two ends of the tungsten coil by using a direct current power supply, for a period of 18 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released, until the gas pressure in the container was normal pressure, and then the black powder was placed in a sufficient amount of 1 M hydrochloric acid for 24 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 12

Step 1, a magnesium powder (8 g) and a magnesium oxide powder (64 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 30 μm, and the magnesium oxide powder had a purity of 99.9%, and an average particle diameter of 50 μm;

Step 2, the graphite square boat containing the mixed powder and tungsten coil in Step 1 was placed in a sealed pressure-resistant steel container with a volume of 10 L, the pressure of the sealed pressure-resistant container was reduced to $2 \times 10^{-4}$ Pa by a molecular pump, and then carbon dioxide gas with a purity of 99.9% was introduced into the sealed pressure-resistant container at a flow rate of 3000 sccm, until the pressure in the sealed pressure-resistant container was 1 MPa;

Step 3, a direct current of 3 A was applied to the two ends of the tungsten coil by using a direct current power supply, for a period of 15 s; the reaction between the magnesium powder and the carbon dioxide was initiated by heat generated from the tungsten coil and proceeded in a self-sustaining manner, and a black powder was obtained after reaction for 1.5 min;

Step 4, the excessive gas in the sealed pressure-resistant container was released, until the gas pressure in the container was normal pressure, and then the black powder was placed in a sufficient amount of 1 M hydrochloric acid for 26 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 13

Step 1, a magnesium powder (8 g) and a magnesium oxide powder (64 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 30 μm, and the magnesium oxide powder has a purity of 99.9%, and an average particle diameter of 50 μm;

Step 2, the graphite square boat containing the mixed powder and tungsten coil in Step 1 was placed in a sealed pressure-resistant steel container with a volume of 50 L, the pressure of the sealed pressure-resistant container was reduced to $2 \times 10^{-4}$ Pa by a molecular pump, and then carbon dioxide gas with a purity of 99.9% was introduced into the sealed pressure-resistant container at a flow rate of 5000 sccm, until the pressure in the sealed pressure-resistant container was 1 MPa;

Step 3, a direct current of 10 A was applied to the two ends of the tungsten coil by using a direct current power supply, for a period of 15 s; the reaction between the magnesium powder and the carbon dioxide was initiated by heat generated from the tungsten coil and proceeded in a self-sustaining manner, and a black powder was obtained after reaction for 1.5 min;

Step 4, the excessive gas in the sealed pressure-resistant container was released, until the gas pressure in the container was normal pressure, and then the black powder was placed in a sufficient amount of 1 M hydrochloric acid for 20 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 14

Step 1, a magnesium powder (8 g) and a magnesium oxide powder (64 g), were mixed homogeneously to obtain a mixed powder, the mixed powder was placed in a graphite square boat, and tungsten coil were embedded in the mixed powder, wherein the magnesium powder had a purity of 99.9%, and an average particle diameter of 200 μm, and the magnesium oxide powder has a purity of 99.9%, and an average particle diameter of 200 μm;

Step 2, the graphite square boat containing the mixed powder and tungsten coil in Step 1 was placed in a sealed pressure-resistant steel container with a volume of 200 L, the pressure of the sealed pressure-resistant container was reduced to $2 \times 10^{-4}$ Pa by a molecular pump, and then carbon dioxide gas with a purity of 99.9% was introduced into the sealed pressure-resistant container at a flow rate of 10000 sccm, until the pressure in the sealed pressure-resistant container was 1 MPa;

Step 3, a direct current of 3 A was applied to the two ends of the tungsten coil by using a direct current power supply, for a period of 10 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released, until the gas pressure in the container was normal pressure, and then the black powder was placed in a sufficient amount of 1.5 M hydrochloric acid for 15 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 15

Step 1, a magnesium powder (8 g) and a magnesium oxide powder (64 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 80 μm, and the magnesium oxide powder had a purity of 99.9%, and an average particle diameter of 50 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2\times10^{-4}$ Pa by a molecular pump, and then carbon dioxide gas with a purity of 99.9% was introduced into the sealed pressure-resistant container at a flow rate of 3500 sccm, until the pressure in the sealed pressure-resistant container was 1 MPa;

Step 3, a direct current of 1 A was applied to the two ends of the tungsten coil by using a direct current power supply, for a period of 10 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released until the gas pressure in the container was normal pressure, and then the black powder was placed in a sufficient amount of 2 M hydrochloric acid for 22 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 16

Step 1, a magnesium powder (8 g) and a magnesium oxide powder (64 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 30 μm, and the magnesium oxide powder had a purity of 99.9%, and an average particle diameter of 50 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2\times10^{-4}$ Pa by a molecular pump, and then carbon dioxide gas with a purity of 99.9% was introduced into the sealed pressure-resistant container at a flow rate of 5000 sccm, until the pressure in the sealed pressure-resistant container was 1 MPa;

Step 3, a direct current of 3 A was applied to the two ends of the tungsten coil by using a direct current power supply, for a period of 10 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released, until the gas pressure in the container was normal pressure, and then the black powder was placed in a sufficient amount of 0.5 M sulphuric acid for 15 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

Example 17

Step 1, a magnesium powder (8 g) and a magnesium oxide powder (64 g) were mixed homogeneously to obtain a mixed powder, the mixed powder was placed in a graphite square boat, and tungsten coil were embedded in the mixed powder, wherein the magnesium powder had a purity of 99.9%, and an average particle diameter of 30 μm, and the magnesium oxide powder had a purity of 99.9%, and an average particle diameter of 100 μm;

Step 2, the graphite square boat containing the mixed powder and tungsten coil in Step 1 was placed in a sealed pressure-resistant steel container with a volume of 24 L, the pressure of the sealed pressure-resistant container was reduced to $2\times10^{-4}$ Pa by a molecular pump, and then carbon dioxide gas with a purity of 99.9% was introduced into the sealed pressure-resistant container at a flow rate of 5000 sccm, until the pressure in the sealed pressure-resistant container was 1 MPa;

Step 3, a direct current of 0.5 A was applied to the two ends of the tungsten coil by using a direct current power supply, for a period of 30 s; the reaction between the magnesium powder and the carbon dioxide was initiated by heat generated from the tungsten coil and proceeded in a self-sustaining manner, and a black powder was obtained after reaction for 1 min;

Step 4, the excessive gas in the sealed pressure-resistant container was released, until the gas pressure in the container was normal pressure, and then the black powder was placed in a sufficient amount of 0.2 M nitric acid for 48 h; the excessive magnesium oxide was removed from the product, and then the black powder was washed with deionized water by sucking filtration until the filtrate was neutral, to obtain a filter cake; and the filter cake was freeze-dried to obtain a mesoporous graphene powder.

The examples above are only the preferred example of the present invention, and are not intended to limit the present invention. For those skilled in the art, the present invention can have various changes and modifications. Within the spirit and principle of the present invention, any modifications, equivalents, improvements and the like, shall be included in the protection scope of the present invention.

The invention claimed is:

1. A method for preparing a graphene, comprising the following steps:
    i) placing a mixture comprising a magnesium powder and a solid oxide powder in a carbon dioxide-containing environment, wherein the pressure of carbon dioxide in the environment is above 0.125 MPa;
    ii) heating said mixture to enable the magnesium powder to react with carbon dioxide, thereby obtaining a graphene.

2. The method according to claim 1, further comprising following steps:
    iii) removing magnesium oxide and/or said solid oxide from the product of Step ii).

3. The method according to claim 2, wherein Step iii) comprises: washing the product of Step ii) with an acid.

4. The method according to claim 2, further comprising following steps:
    iv) subjecting the product of Step iii) to one or more operations of washing, filtration or drying.

5. The method according to claim 1, wherein Step i) comprises placing a mixture comprising a magnesium powder and a solid oxide powder in a sealed container filled with carbon dioxide.

6. The method according to claim 5, wherein in Step i), at least one of the following is satisfied:
    the solid oxide powder has an average particle diameter of 0.1~1000 μm;
    the magnesium powder has an average particle diameter of 9~9000 μm.

7. The method according to claim 1, wherein in Step i), a mass ratio of the magnesium powder to the solid oxide powder is 1:0.1~10.

8. The method according to claim 1, wherein said solid oxide is a metal oxide.

9. The method according to claim 8, wherein said solid oxide is magnesium oxide.

10. The method according to claim 1, wherein said solid oxide is an alkaline earth metal oxide.

11. The method according to claim 1, wherein in Step i), at least one of the following is satisfied:
the carbon dioxide in the environment has a pressure of 0.125~10 MPa;
the carbon dioxide in the environment is above 90 volume %.

12. The method according to claim 1, comprising one or more of the following steps:
a) mixing a magnesium powder with a magnesium oxide powder homogeneously to obtain a mixed powder, placing said mixed powder in a sealed pressure-resistant container, and embedding a tungsten coil in said mixed powder;
b) reducing gas pressure in the sealed pressure-resistant container to $2 \times 10^{-4}$ Pa, introducing carbon dioxide gas into said sealed pressure-resistant container until the pressure in said sealed pressure-resistant container is 0.125~10 MPa;
c) applying a direct current of 0.5~30 A to said tungsten coil by using a direct current power supply, for a period of 5-30 s, whereby a reaction between the magnesium powder and the carbon dioxide is initiated by heat generated from said tungsten coil, thereby obtaining a powder after reaction;
d) placing the powder product in Step c) in a dilute acid solution, followed by standing for 6.about.48 h, then washing said powder with deionized water by sucking filtration, collecting a filtrate, and freeze-drying the filtrate to obtain a graphene.

13. A method for preparing a mesoporous graphene, comprising the following steps:
Step 1, mixing a magnesium powder with a magnesium oxide powder homogeneously to obtain a mixed powder, placing said mixed powder in a sealed pressure-resistant container, and embedding a tungsten coil in said mixed powder;
Step 2, reducing pressure in said sealed pressure-resistant container to $2 \times 10^{-4}$ Pa by using a molecular pump, and introducing carbon dioxide gas into said sealed pressure-resistant container until the pressure in said sealed pressure-resistant container is 0.125-10 MPa;
Step 3, applying a direct current of 0.5-30 A to said tungsten coil by using a direct current power supply, for a period of 5-30 s, whereby a reaction between the magnesium powder and the carbon dioxide is initiated by heat generated from the tungsten coil, and after the reaction proceeding for 1-2 min, obtaining a black powder;
Step 4, placing said black powder in a dilute acid solution, followed by standing for 6-48 h, then washing said black powder with deionized water by sucking filtration until the powder is neutral, thereby obtaining a filter cake, and freeze-drying said filter cake to obtain a mesoporous graphene powder.

14. The method for preparing a mesoporous graphene according to claim 13, wherein in Step 1, said magnesium powder has an average particle diameter of 1-1000 μm, and said magnesium oxide powder has an average particle diameter of 0.1-1000 μm.

15. The method for preparing a mesoporous graphene according to claim 13, wherein in Step 1, said mixed powder has a mass ratio of the magnesium powder to the magnesium oxide powder of 1:0-1:10.

16. The method for preparing a mesoporous graphene according to claim 13, wherein said dilute acid solution is a dilute hydrochloric acid, a dilute sulfuric acid or a dilute nitric acid, each having a concentration of 0.2-2 M.

17. The method for preparing a mesoporous graphene according to claim 13, wherein said sealed pressure-resistant container is a sealed pressure-resistant steel container with a volume of 10-200 L.

18. The method for preparing a mesoporous graphene according to claim 13, wherein said freeze-drying in Step 4 comprises following steps:
Step 4.1, placing said filter cake in a plastic beaker, adding deionized water to said plastic beaker, and then carrying out an ultrasonic treatment and a stirring step, thereby obtaining a paste;
Step 4.2, freezing said paste in a cryogenic liquid for 30 min to obtain a black solid;
Step 4.3, drying said black solid in a freeze drier to obtain said mesoporous graphene powder.

19. The method for preparing a mesoporous graphene according to claim 18, wherein in Step 4.1, a mass ratio of said deionized water to said filter cake is 1:1-8:1.

20. The method for preparing a mesoporous graphene according to claim 18, wherein the cryogenic liquid in Step 4.2 is liquid nitrogen, liquid helium or liquid argon.

* * * * *